United States Patent [19]
Krietzman

[11] Patent Number: 6,022,127
[45] Date of Patent: Feb. 8, 2000

[54] MULTI-FUNCTION SWITCHING HEAD FOR USE WITH HANDHELD ILLUMINATION DEVICES

[76] Inventor: Mark Howard Krietzman, P.O. Box 3185, Palos Verdes, Calif. 90274

[21] Appl. No.: 09/114,424

[22] Filed: Jul. 11, 1998

[51] Int. Cl.$^7$ ...................................................... H02J 7/00
[52] U.S. Cl. ........................ 362/259; 362/183; 362/184; 362/185; 362/186; 362/187; 362/188
[58] Field of Search .................................. 362/183, 259, 362/184, 185, 186, 187, 188, 202, 207, 208

[56] References Cited

U.S. PATENT DOCUMENTS

| | | | |
|---|---|---|---|
| 5,678,921 | 10/1997 | Kish et al. | 362/205 |
| 5,806,961 | 9/1998 | Dalton et al. | 362/183 |
| 5,865,525 | 2/1999 | Kibler et al. | 362/187 |
| 5,865,526 | 2/1999 | Maglica | 362/207 |

*Primary Examiner*—Cassandra Spyrou
*Assistant Examiner*—Mohammad Y. Sikder
*Attorney, Agent, or Firm*—Mark Krietzman

[57] ABSTRACT

A novel multi-function switching head for use with handheld illumination devices for switching electrical current to multiple illumination sources and for selecting from multiple battery power supplies.

13 Claims, 14 Drawing Sheets

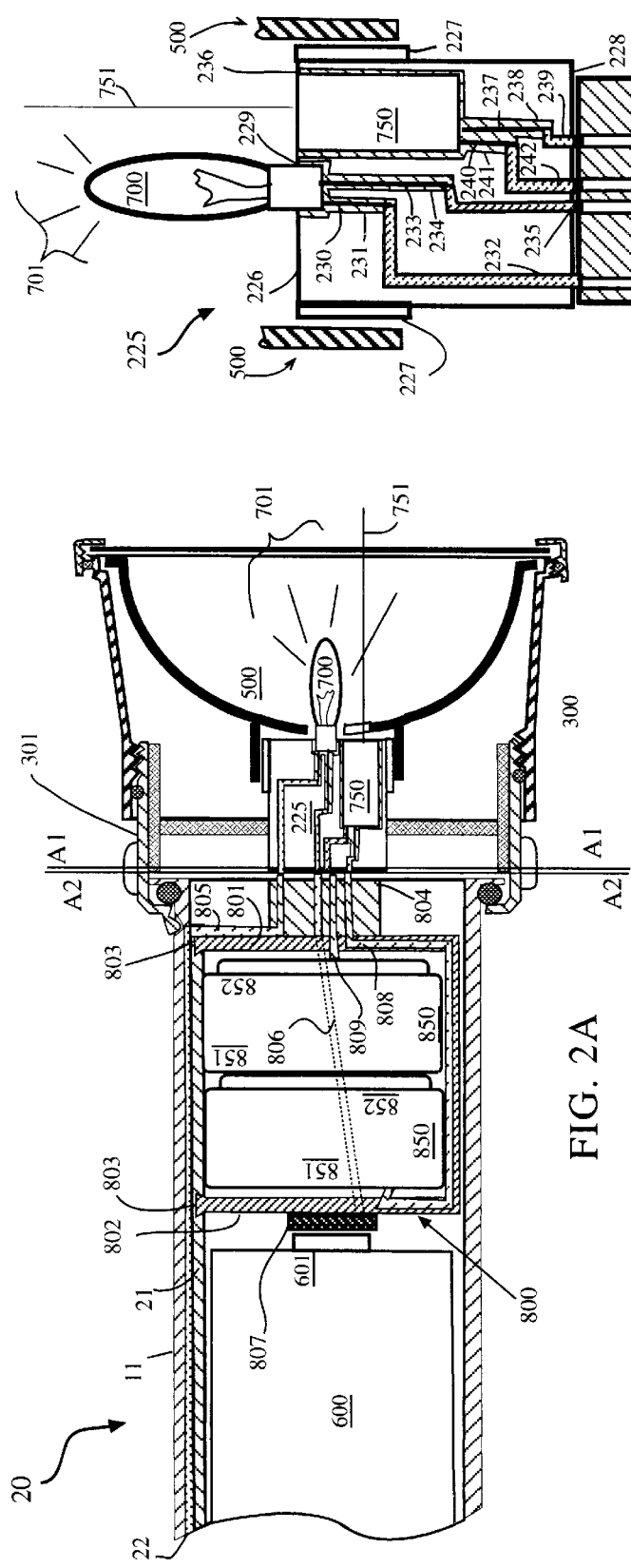
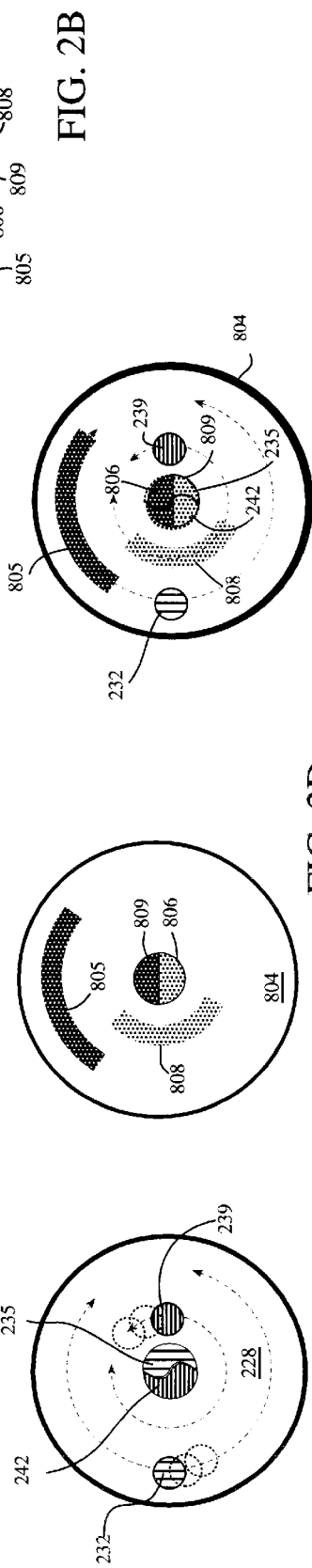
FIG. 2A
FIG. 2B
FIG. 2C
FIG. 2D
FIG. 2E

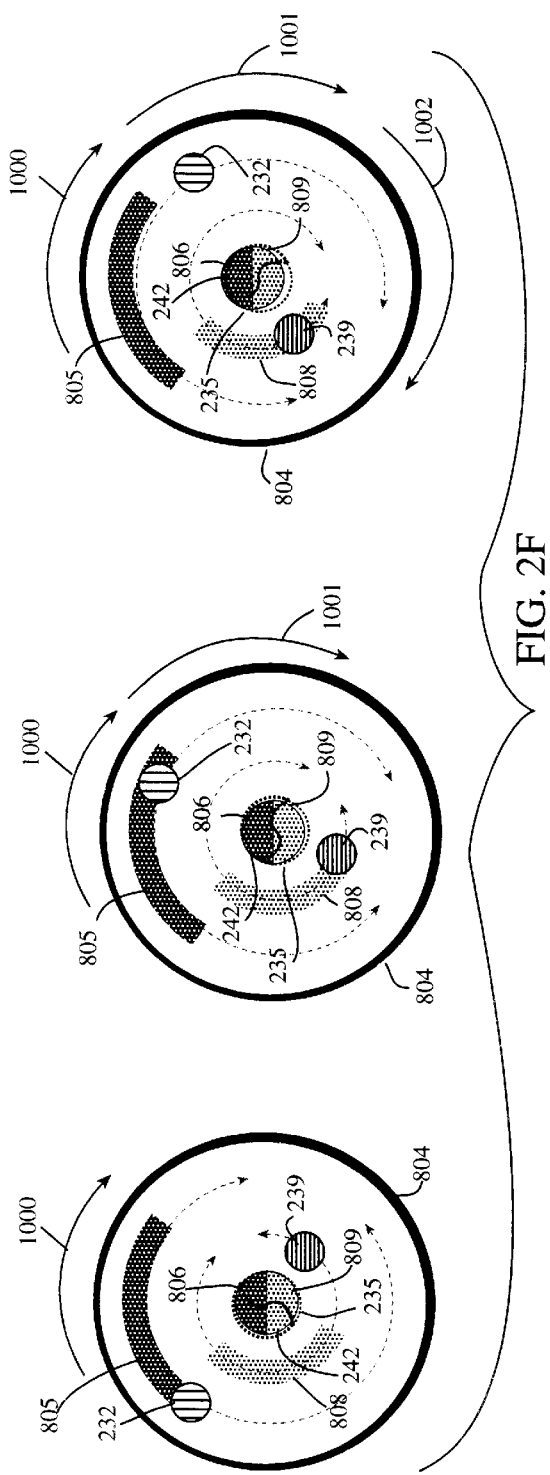
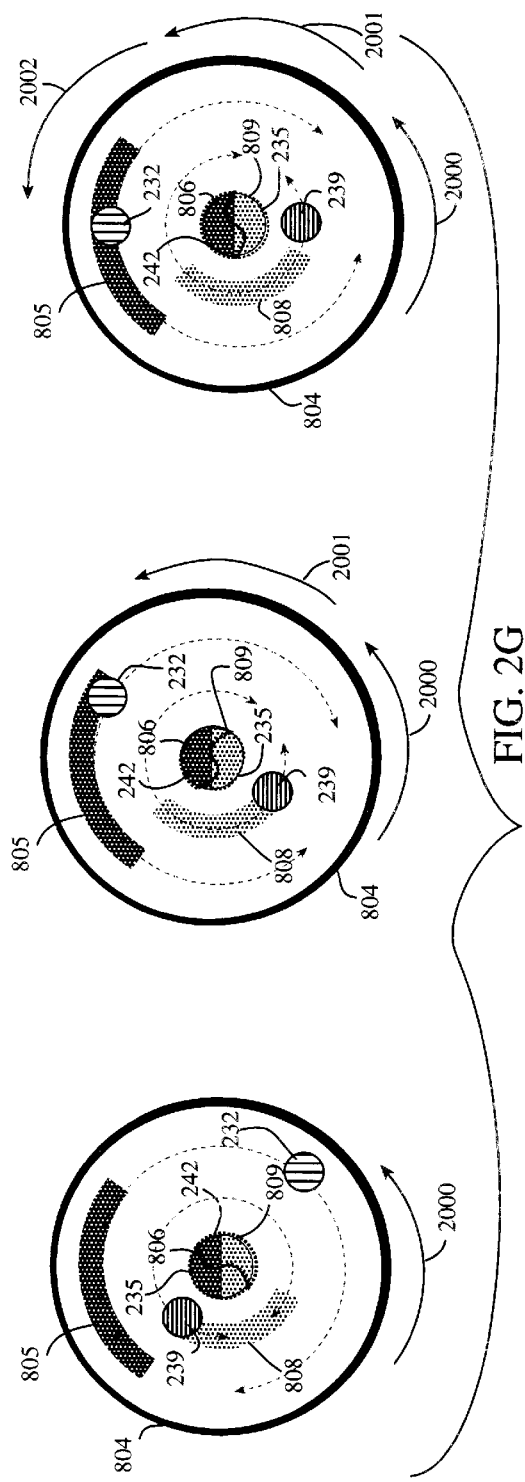
FIG. 2F
FIG. 2G

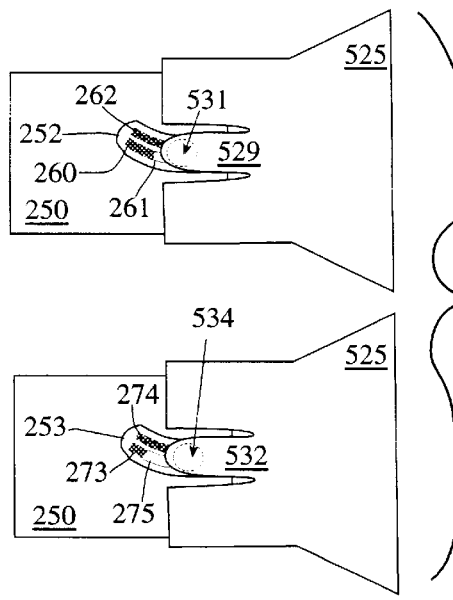
FIG. 3D
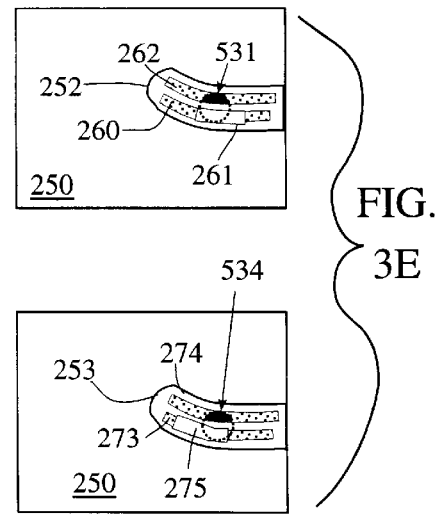
FIG. 3E
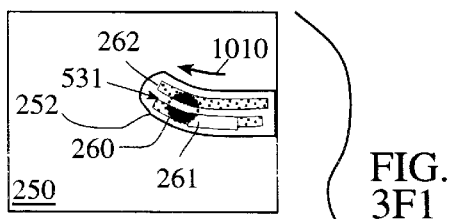
FIG. 3F1
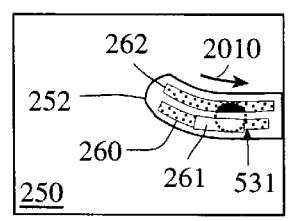
FIG. 3G1
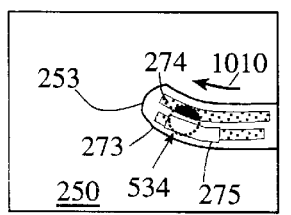
FIG. 3F2
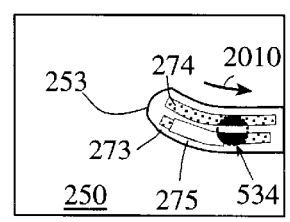
FIG. 3G2

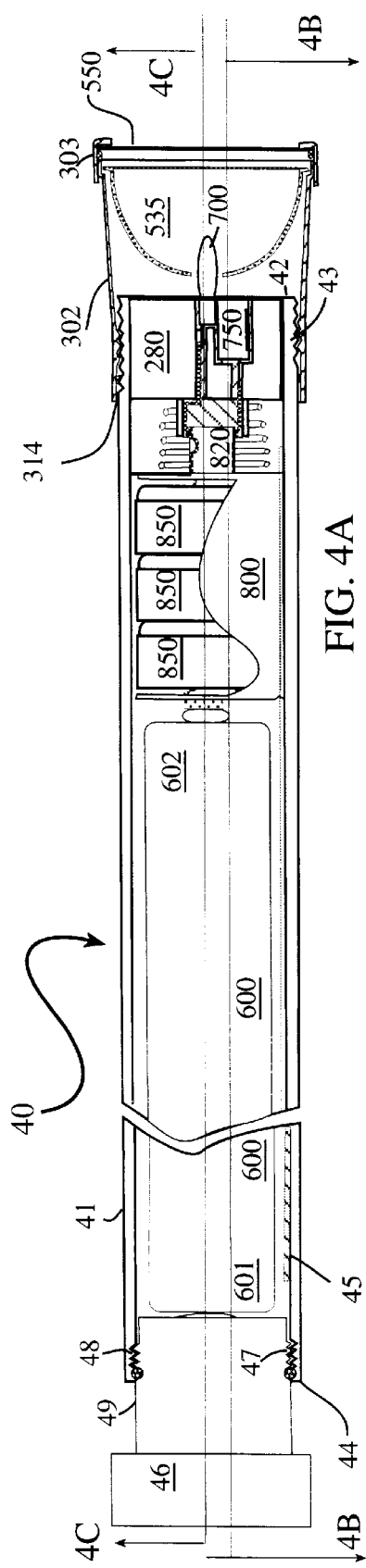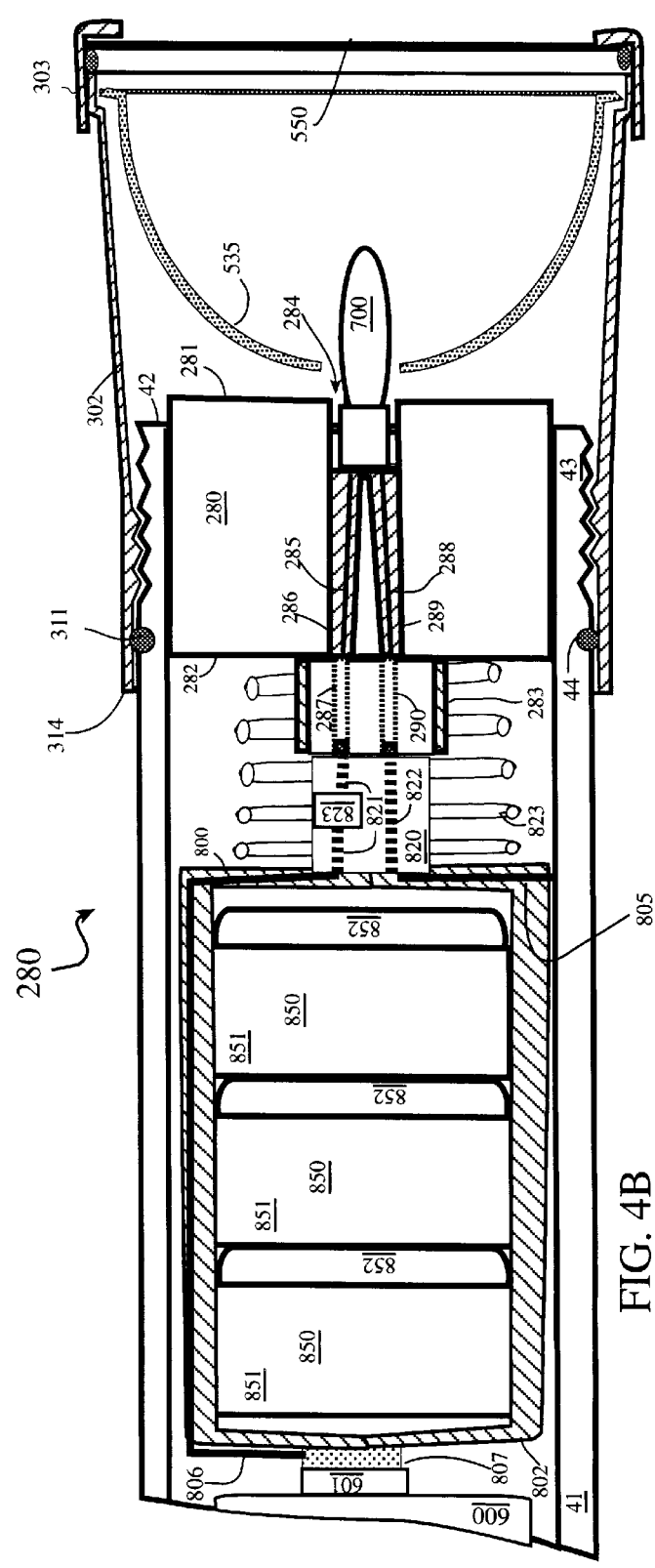
FIG. 4A
FIG. 4B

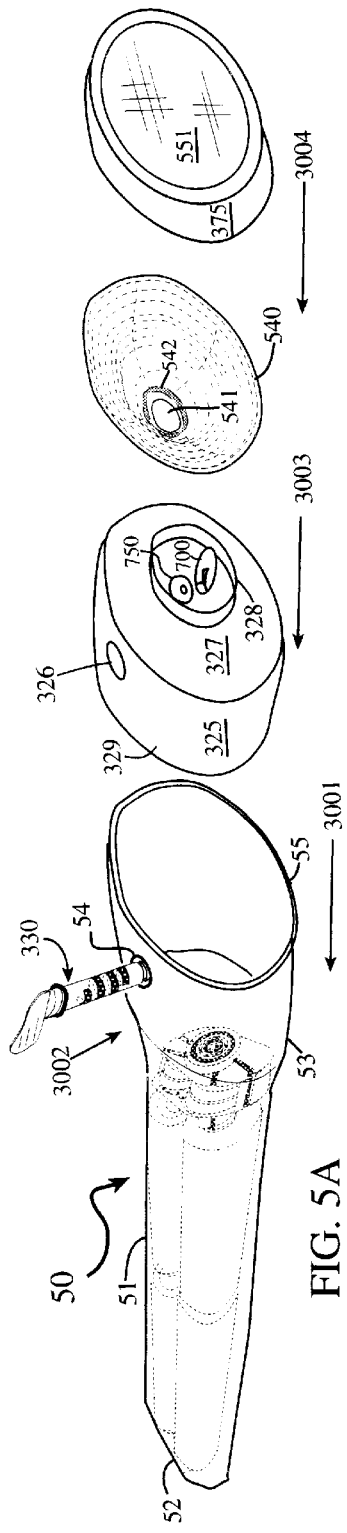
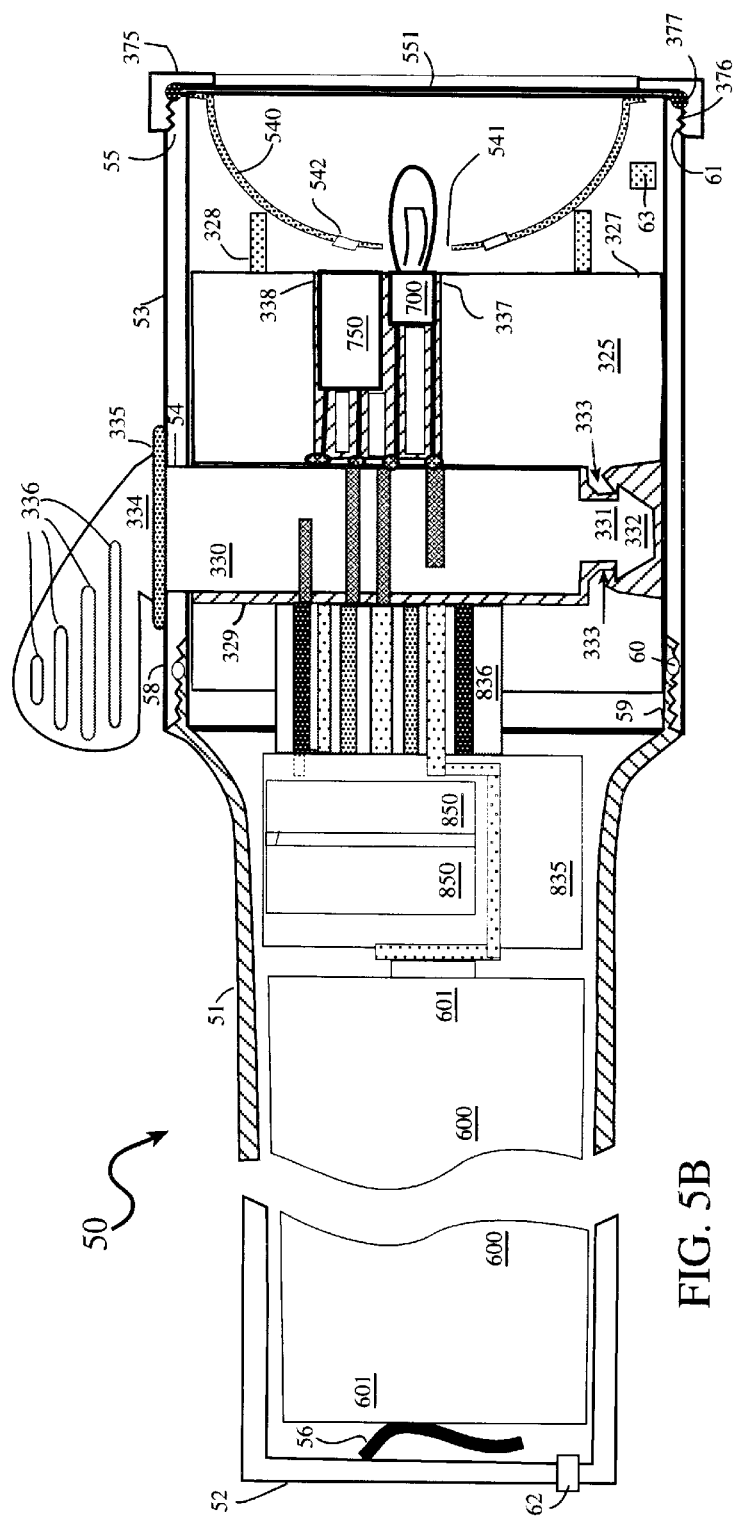
FIG. 5A
FIG. 5B

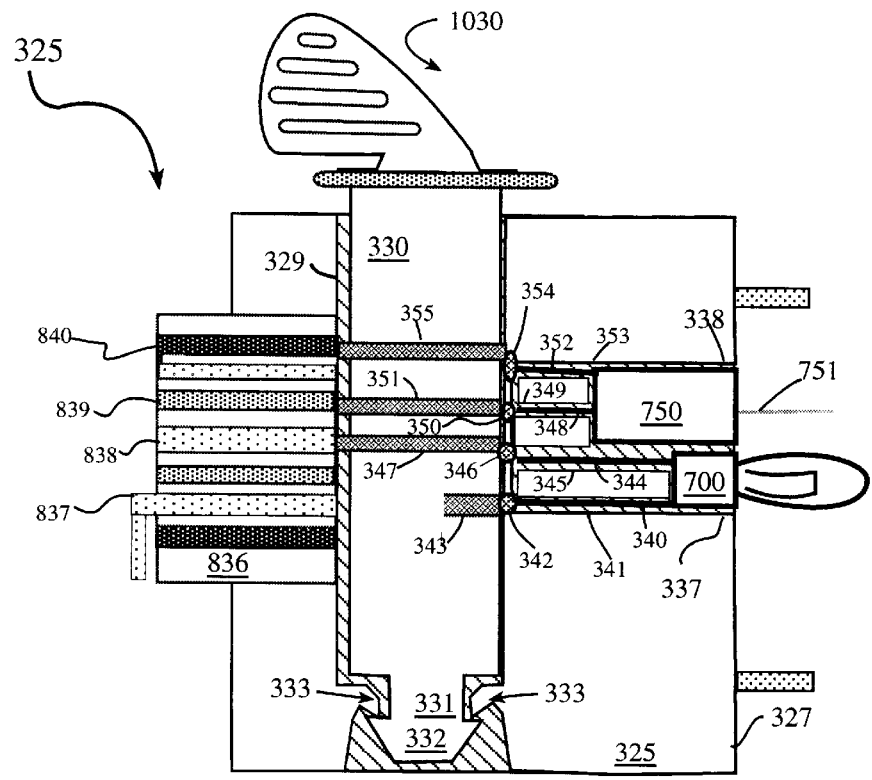
FIG. 5C1
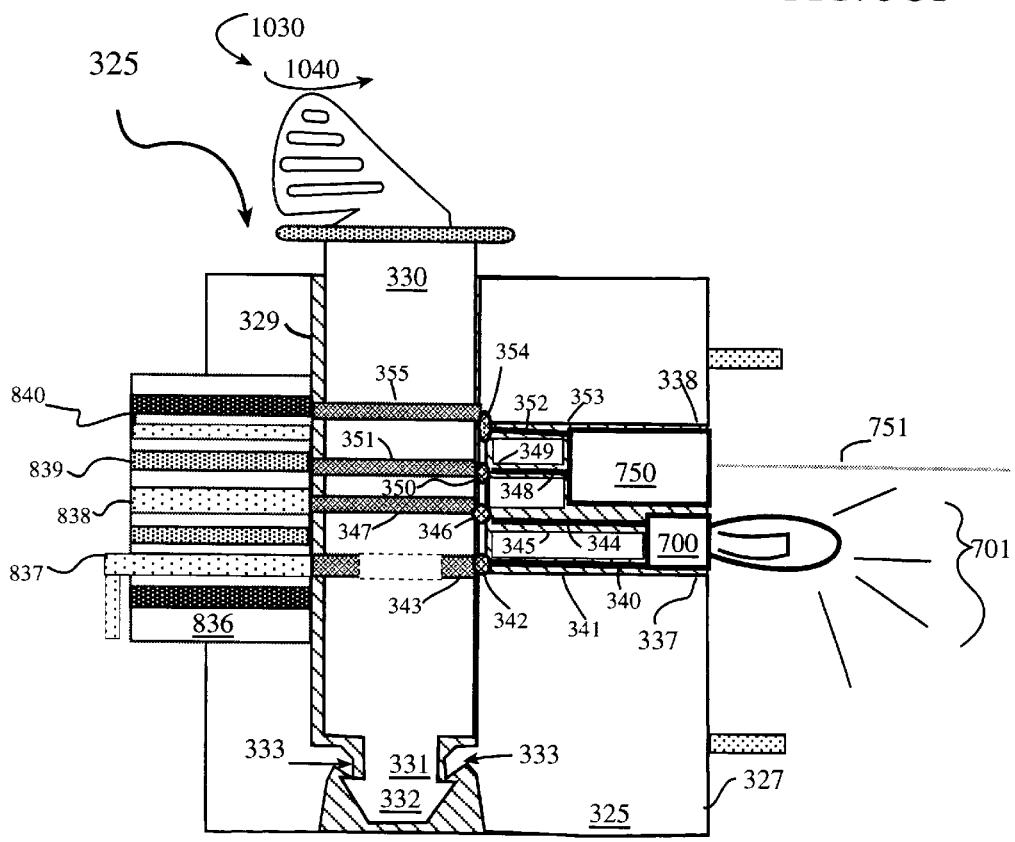
FIG. 5C2

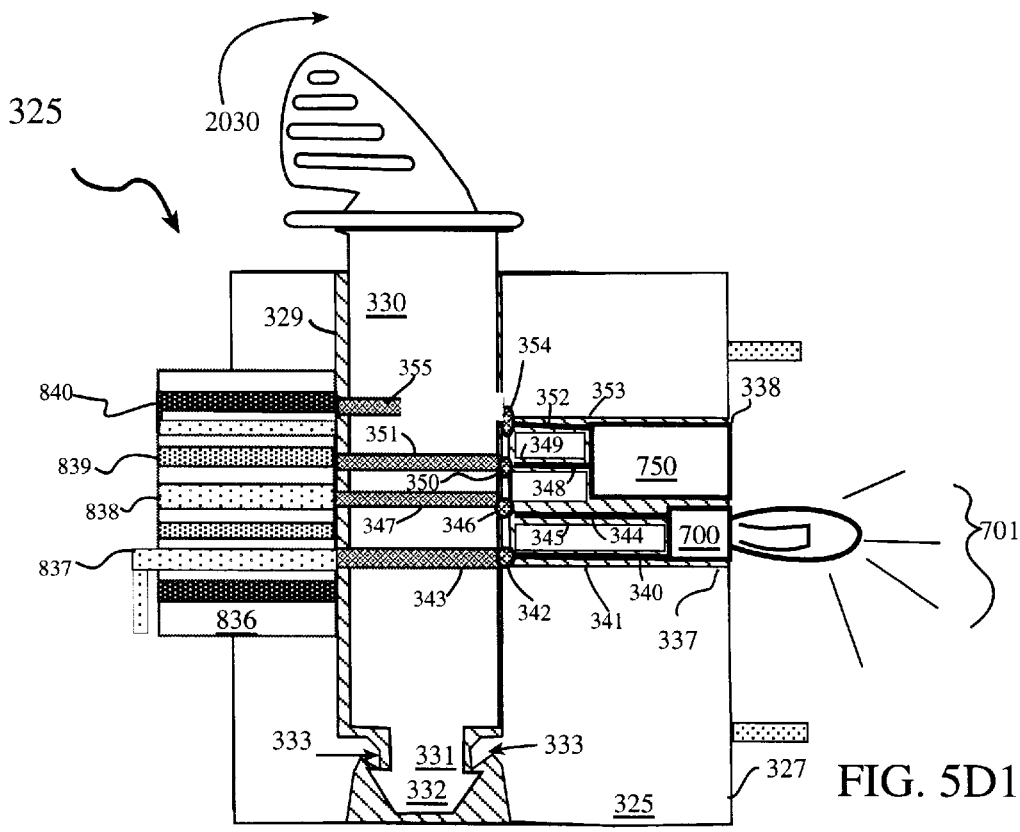
FIG. 5D1
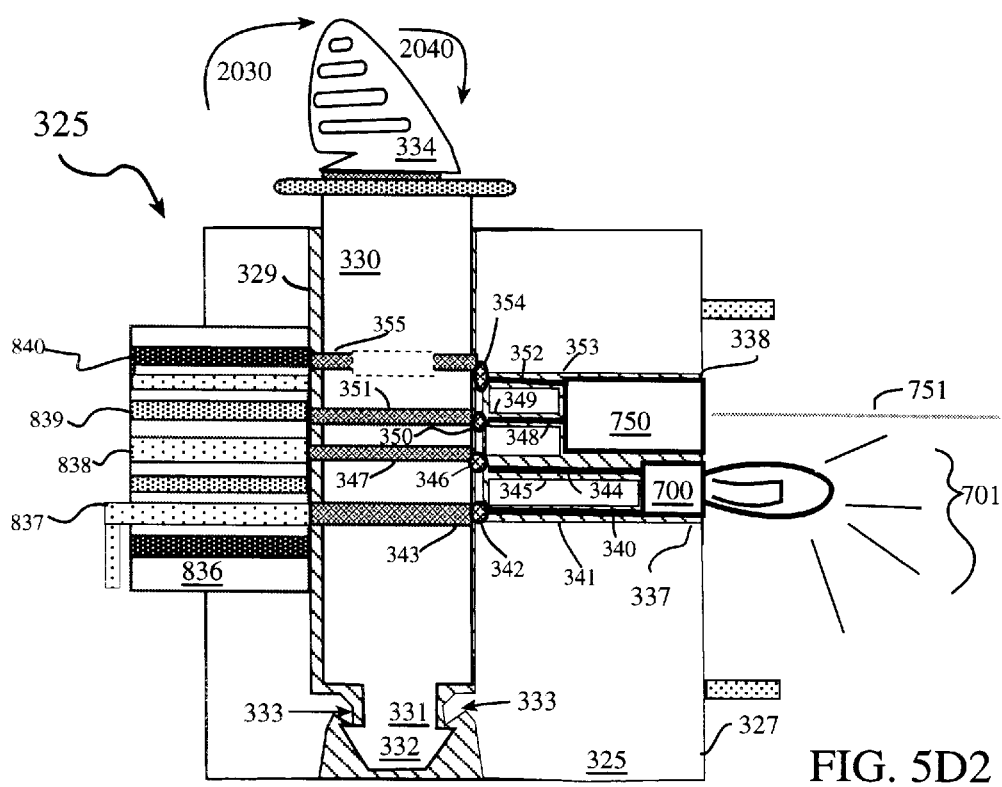
FIG. 5D2

MULTI-FUNCTION SWITCHING HEAD FOR USE WITH HANDHELD ILLUMINATION DEVICES

RELATED APPLICATIONS

The within invention is related to applicant's applications: "LASER LIGHT", filed Aug. 21, 1997, Ser. No. 08/918,514 and "SECONDARY POWER SUPPLY FOR USE WITH HANDHELD ILLUMINATION DEVICES" filed Mar. 10, 1998, Ser. No. 09/038,726, now U.S. Pat. No. 5,909,062.

BACKGROUND OF THE INVENTION

1. Field of the Invention

This present invention relates to a novel switchable, submersible and non-submersible handheld illumination devices such as a flashlight, laser pointer devices or the combination of both such as those disclosed in applicant's related applications Ser. Nos. 08/918,514, and 09/038,726, and more particularly to a multiple function power supply switch selector for use with multiple illumination sources.

2. Background

The benefits of a combination flashlight for illumination and laser pointer for precise communication are set forth in applicant's related applications Ser. Nos. 08/918,514 and 09/038,726. Those acquainted with underwater or emergency situations will recognize the associated benefits of having a easily visible underwater laser pointing device and a switchable secondary or redundant illumination source or power supply.

Those familiar with underwater illumination, fishing, and diving will recognize the benefits of the fish attracting properties of the coherent laser output, produces by a submersible laser illumination device for both observing and harvesting sea-life.

Moreover, those familiar with handheld flashlights will recognize the utility of having a single switch, either actuate by a rotating head, tail cap, or thumb switch, to activate the primary, secondary or combined illumination sources.

SUMMARY OF INVENTION

Accordingly, it is an object of the invention to provide a novel multi-function switch for use with a hand held illuminator.

It is yet another object of the invention to provide a novel multi-function switch for electrically connecting a single power source to switchable illumination sources.

It is yet another object of the invention to provide a novel multi-function switch for electrically connecting a plurality of power sources to switchable illumination sources.

It is yet another object of the invention to provide a novel multi-function switch for electrically connecting a plurality of power sources to multiple illumination sources.

It is yet another object of the invention to provide a novel multi-function switch for electrically connecting a primary and a secondary battery power supply to a first and a second illumination source.

It is yet another object of the invention to provide a novel multi-function water-tight switch for electrically connecting a primary and a secondary battery power supply to a first or a second illumination source.

It is yet another object of the invention to provide a novel tail actuated multi-function switch for electrically connecting a plurality of battery power sources to switchable illumination sources.

It is yet another object of the invention to provide a novel head actuated multi-function switch for electrically connecting a plurality of battery power sources to switchable illumination sources.

It is yet another object of the invention to provide a finger actuated multi-function switch for electrically connecting a plurality of battery power sources to switchable illumination sources.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

BRIEF DESCRIPTION OF THE DRAWINGS

FIG. 2A illustrates a cut-away side view of an alternate embodiment of a handheld illumination device with a multi-function switching head.

FIG. 2B illustrates a cut-away component view of the dual output illumination head shown in FIG. 2A.

FIG. 2C illustrates a cut-away front view of the embodiment shown in FIG. 2A at line "A1".

FIG. 2D illustrates a cut-away front view of the side view of the embodiment shown in FIG. 2A at line "A2".

FIG. 2E illustrates an overlay view of "A1" & "A2" of the embodiment shown in FIG. 2A.

FIG. 2F illustrates a clockwise sequential rotational view of the overlay view of "A1" & "A2" shown in FIG. 2E.

FIG. 2G illustrates a counter-clockwise sequential rotational view of the overlay view of "A1" & "A2" shown in FIG. 2E.

FIG. 3D illustrates a side component view of left and right sides of the illumination head and reflector dish with electrical contacts shown in FIG. 3A.

FIG. 3E illustrates a side view of the of left and right sides of the illumination head with cut-away reflector dish revealing the electrical contacts shown in FIG. 3E.

FIG. 3F1 illustrates a left and right side clockwise sequential rotational view of the movement of the reflector dish mounted electrical contacts in relationship to the plug-in illumination head shown in FIG. 3E.

FIG. 3F2 illustrates another left and right side clockwise sequential rotational view of the movement of the reflector dish mounted electrical contacts in relationship to the plug-in illumination head shown in FIG. 3E.

FIG. 3G1 illustrates a left and right side counter-clockwise sequential rotational view of the movement of the reflector dish mounted electrical contacts in relationship to the plug-in illumination head shown in FIG. 3E.

FIG. 3G2 illustrates another left and right side counter-clockwise sequential rotational view of the movement of the reflector dish mounted electrical contacts in relationship to the plug-in illumination head shown in FIG. 3E.

FIG. 4A illustrates a cut-away side view of an alternate embodiment of a handheld illumination device with a tail actuated multi-function switching head.

FIG. 4B illustrates a top sectional view of the slide illumination head of the embodiment shown in FIG. 4A at line "4B".

FIG. 5A illustrates a front perspective assembly view of a alternate embodiment of a handheld illumination device with a finger actuated multi-function switching head.

FIG. 5B illustrates a cut-away side view of the embodiment shown in FIG. 5A.

FIG. 5C1 illustrates a cut-away component view of the counter-clockwise rotation of the finger actuated switch shown in FIG. 5B.

FIG. 5C2 illustrates a cut-away component view of the counter-clockwise rotation of the finger actuated switch shown in FIG. 5B.

FIG. 5D1 illustrates a cut-away component view of the clockwise rotation of the finger actuated switch shown in FIG. 5B.

FIG. 5D2 illustrates a cut-away component view of the clockwise rotation of the finger actuated switch shown in FIG. 5B.

MODES FOR CARRYING OUT THE INVENTION

Figure 1A:
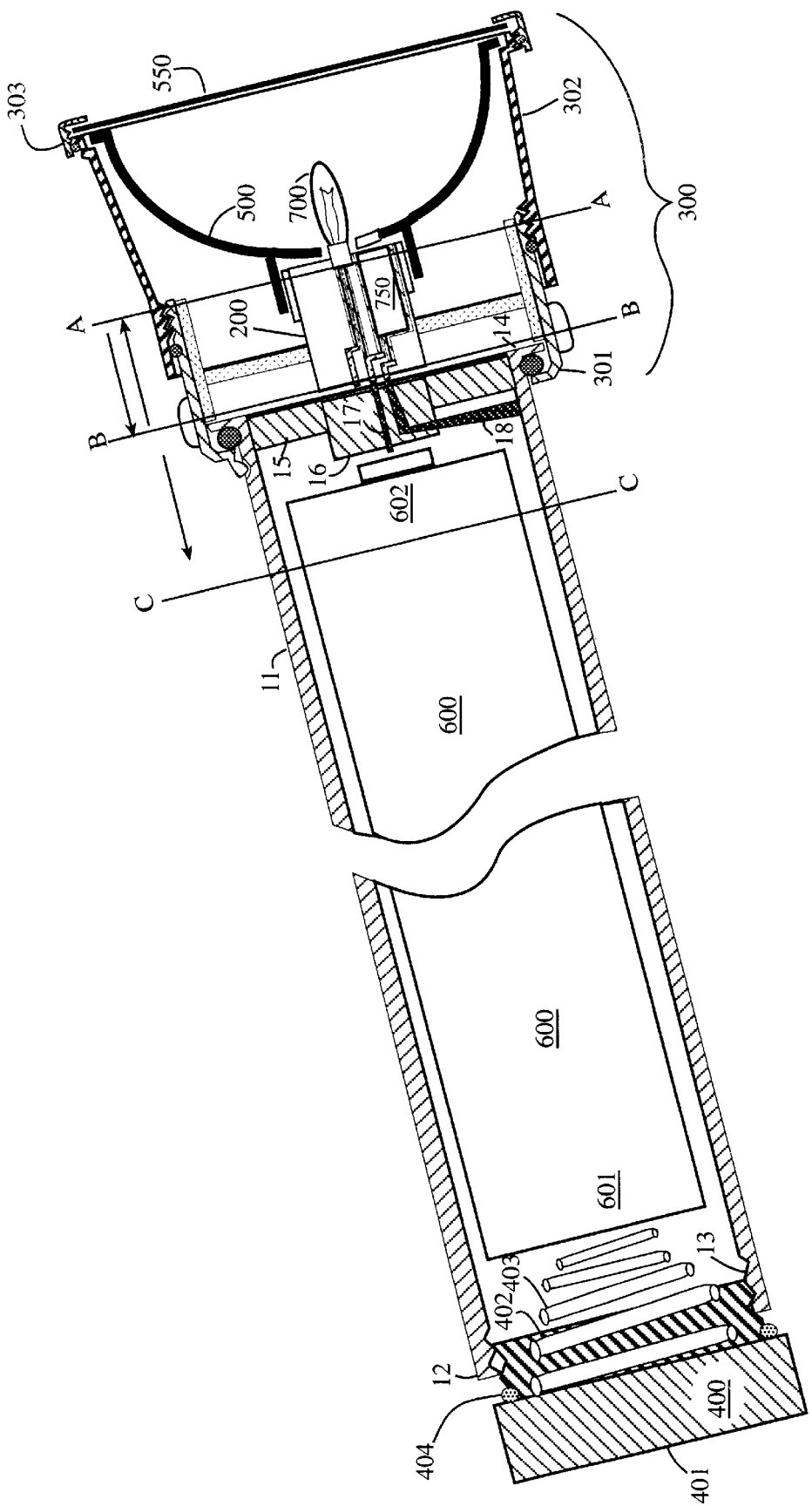
FIG. 1A illustrates a cut-away side view of a handheld illumination device with the preferred embodiment of the multi-function switching head.

Referring now to the drawings, there is illustrated in FIG. 1A a cut-away side view of a handheld illuminator with a multi-function switching head generally designated 10.

The primary battery power supply generally designated 600 is inserted into a tubular housing 11 through the tail end 12 which is internally threaded 13. A tail cap 400 with a backside 401, and an externally threaded front-side 402, mates with the internally threaded 13 tail end 12 of the housing. A conductive contact spring 403 is affixed within the tail cap 400 and is in contact with the rear battery power supply terminal 601. A rear "O" ring 404 is interposed between the tail cap 400 and tail end 12. The head receiving front end of the tubular housing 11 is formed by a raised annular wall 14.

Mounted within the front end of the tubular housing 11 are a series of contact plate supports 15 to which the non-conductive contact plate 16 is affixed. A first electrical contact 17 and a second electrical contact 18 are attached to the non-conductive contact plate 16. The first electrical contact 17 abuts the front battery supply terminal 602. The second electrical contact 18 is in contact with the conductive interior surface of the tubular housing 11.

The head assembly generally designated 300, supports the illumination head, generally designated 200, the parabolic reflecting dish generally designated 500, and the light-bulb and laser emitting diode illumination sources 700 & 750 which are affixed to the illumination head generally designated 200 and electrically connected to the battery power supply 600 via the first and second electrical contact 17 & 18.

Figure 1B:
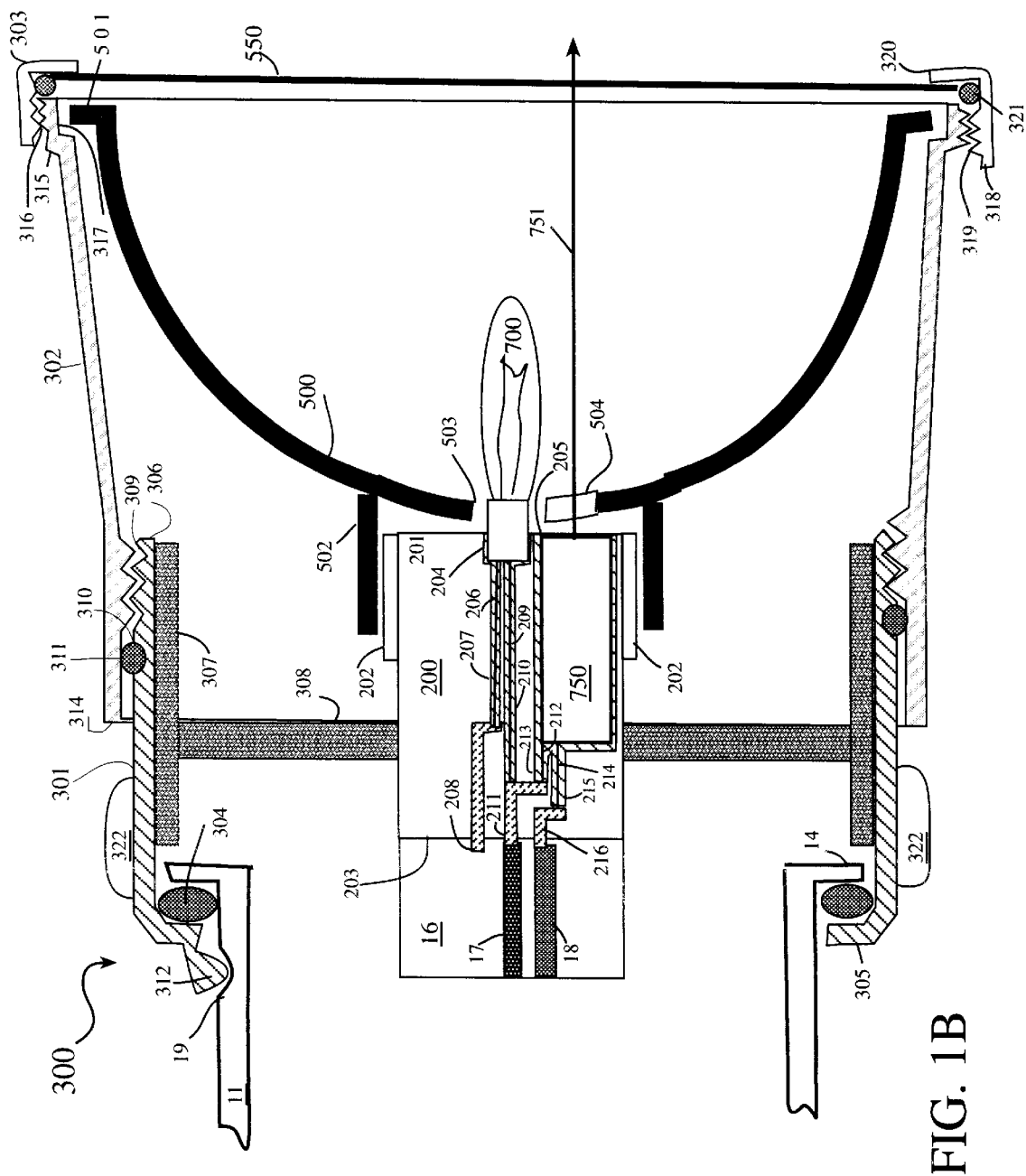
FIG. 1B illustrates a partial cut-away side view of the preferred embodiment of the multi-function switching head.

Referring now to FIG. 1B, there is illustrated a partial cut-away side view of preferred embodiment of the multi-function switching head generally designated 300.

The head assembly 300 has three nested components, a switching neck 301, whereby the head assembly 300 is rotatably connected to the front end of the tubular housing 11 at the raised annular wall 14; a focusing neck 302, whereby the parabolic dish 500 can be directed forward or backward relative to the illumination head 200; and, a front collar 303, whereby a protective lens 550 is affixed in front of the parabolic dish 500. The head assembly 300 is affixed as a water-tight unit to the tubular housing 11. A series of "O" rings maintain the water-tight seals.

During assembly of the device a large rubber or silicone "O" ring 304 is placed snugly behind the raised annular wall 14. The tail end 13 is then passed through the switching neck 301 and the switching neck's rear annular wall 305 is placed snugly on the other-side of the large "O" ring 304. Through the front end 306 of the switching neck, the alignment support ring 307 and illumination head support arms 308 are mounted firmly, yet rotatably, against the large "O" ring 304. The front end 306 of the switching neck is externally threaded 309 and also provides a medium sized "O" ring grove 310 which holds a medium sized "O" ring 311, used for creating a water-tight seal, in place. To guide the rotation of the switching neck 301 to pre-selected positions an extend tab 312 is formed as part of, or affixed to, the switching neck's rear annular wall 305 and mates with a series of tab guides 19 formed in the tubular housing 11.

The focusing neck 302 is tubular and has internally threaded back end 314 of a size and shape to fit over the medium sized "O" ring 311, and mate rotatably with the externally threaded 309 front end 306 of the switching neck. The front 315 of the focusing neck 302 is also externally threaded 316 and has an internal dish catch 317 formed therein whereby the parabolic reflecting dish 500 is removably and firmly held in place by pressure exerted from the front collar 303. The front collar 303 has a connecting wall 318 which is internally threaded 319 to removably mate with the externally threaded 316 focusing neck 302. The leading edge 320 of the front collar 303 is of a size and shape to hold the protective lens 550 against the front 315 of the focusing neck 302. A small "O" ring 321 is interposed between the protective lens 550 and the front 315 of the focusing neck 302 to assure a water-tight seal.

The parabolic reflecting dish 500 has a extended leading edge 501 of a size and shape to fit loosely within the internal dish catch 317. Extending from the back of the parabolic reflecting dish 500 is a tubular illumination head guide 502. A bulb guide 503 is formed in the center of the parabolic reflecting dish 500 and a laser output window 504 is formed adjacent to the bulb guide 503.

The illumination head 200 is affixed to the illumination head support arms 308. The illumination head 200 has a circular front 201 surrounded by two arched dish guides 202 which prevent the parabolic reflecting dish 500 from rotating and restrict its movement to forward and backward when the focusing neck 302 is rotated. The circular rear of the illumination head 203 is seated against the contact plate 16. Through the circular front 201 a light-bulb catch 204 and a laser diode catch 205 are formed into which a light-bulb 700 may be removably inserted. A first light-bulb contact 206 passes through the first light-bulb contact guide 207 extending from the rear of the light-bulb catch 204 and is in contact with the top contact strip 208. In this configuration the top contact strip 208 terminates at the non-conductive contact plate 16. A second light-bulb contact 209 passes through the second light-bulb contact guide 210 and is in contact with the middle contact strip 211. In this configuration the middle contact strip 211 is conductively connected to the first electrical contact 17. The light-bulb 700 is not receiving electrical current.

Also mounted within the illumination head 200 is a laser emitting diode with drive circuitry 750. The laser emitting diode is readily available and is known art. The diode comprises a laser beam module with a control circuit. Since the laser emitting diode is well known in the art, it is unnecessary to present a detailed statement of its construction in the present invention. A first laser contact 212 passes through the first laser contact guide 213 extending from the rear of the laser diode catch 205 and is in contact with the middle contact strip 211. A second laser contact 214 passes through the second laser diode contact guide 215 and is in contact with the lower contact strip 216. In this configuration the first laser contact 212 via the middle contact strip 211 is conductively connected to the first electrical contact 17, to complete the laser diode power circuit the lower contact strip 216 is conductively connected electrically contacted to the second electrical contact 18 and the laser output 751 is emitted by the laser emitting diode 750. To switch the first & second electrical contacts 17 & 18 from the laser emitting diode 750 to the light-bulb 700 the user must rotate the switching neck 302 one-hundred and eighty degrees. To switch and power both the laser emitting diode 750 and the light-bulb 700, the user must rotate the switching neck 302 ninety degrees to a combined contact strip (shown in FIG. 1D). A series of raised hand grips 322 are formed around the exterior of the switching neck 301 to provide a gripping surface.

Figure 1D:
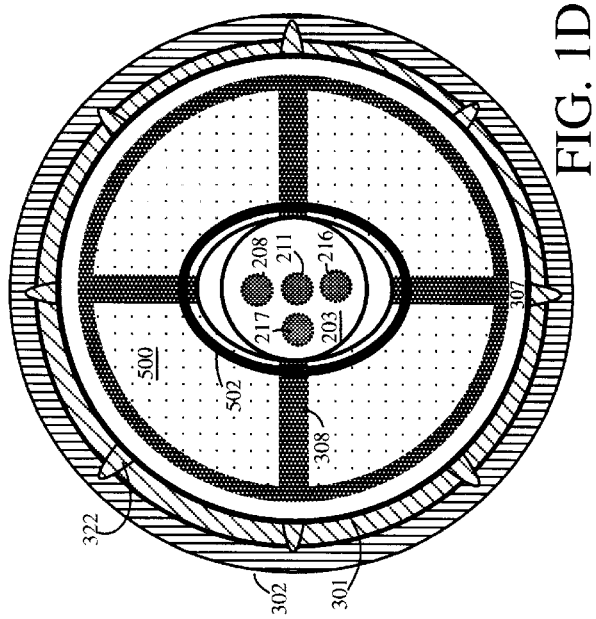
FIG. 1D illustrates a cut-away front view of the preferred embodiment of FIG. 1A from line "B" to "A".
Figure 1F:
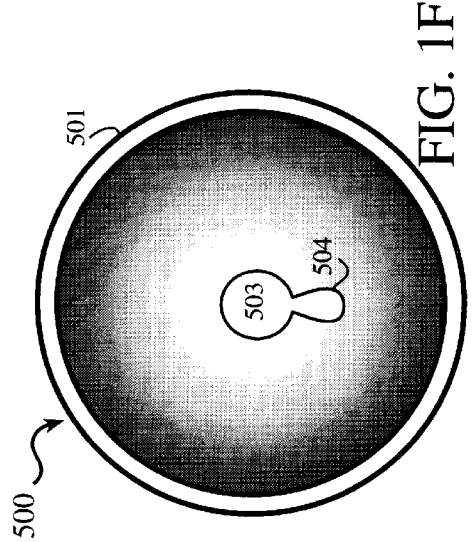
FIG. 1F illustrates a front component view of the reflector dish of FIG. 1A.
Figure 1C:
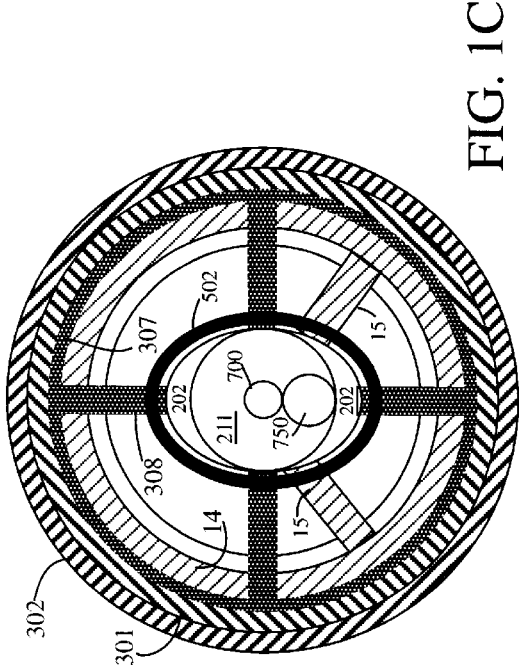
FIG. 1C illustrates a cut-away front view of the preferred embodiment of FIG. 1A from line "A" to "B".

Referring now to FIG. 1C there is illustrated a cut-away front view of the preferred embodiment of FIG. 1A from line "A" to "B." The focusing neck 302 and switching neck 301 surround the raised annular wall 14. The illumination head support arms 308 extend from the alignment support ring 307, the tubular illumination head guide 502 is of a size and shape to fit around circular front 201 of the illumination head and the two arched dish guides 202. The light-bulb 700 is affixed at the center of the circular front 211 and the laser emitting diode 750 is mounted below the light bulb 700.

Referring now to FIG. 1D there is illustrated a cut-away front view of the preferred embodiment of FIG. 1A from line "B" to "A". The series of raised hand grips 322 surround the exterior of the switching neck 301. Mounted within and terminating at the circular rear of the illumination head 203 are the top 208, middle 211 lower 216 and combined 217 contact strips. Not shown is the electrical connection between both the first light-bulb contact 206 second laser contact 214 and the combined contact strip 217.

Figure 1E:
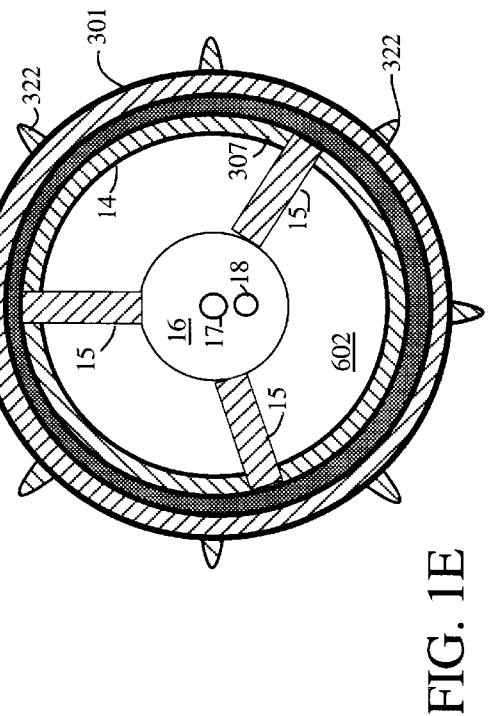
FIG. 1E illustrates a cut-away front view of the preferred embodiment of FIG. 1A from line "B" to "C".

Referring now to FIG. 1E there is illustrated a cut-away front view of the preferred embodiment of FIG. 1A from line "B" to "C". Affixed to the tubular housing 11 are a series of contact plate supports 15 which keep the non-conductive contact plate 16 aligned in a predetermined position, terminating on the front of the non-conductive contact plate 16 and adjacent to the circular rear of the illumination head 203 (not shown) are the first electrical contact 17 and the second electrical contact 18 whereby the light-bulb, the laser emitting diode 750 may be electrically connected to the battery power supply 600. To switch "on" or "off" the current to the light-bulb 700 or the laser emitting diode 750 the raised hand grips 322 are used to rotate the switching neck 301 which in-turn may be used to place the first electrical contact 17 and the second electrical contact 18 in contact with the top 208 and middle 211 (shown in FIG. 1D) thus supplying electrical current to the light-bulb 700, with the middle 211 and lower 216 contact strips (shown in FIG. 1D) thus supplying electrical current to the laser emitting diode 750, or the middle 211 and combined 217 strips (shown in FIG. 1D).

Referring now to FIG. 1F there is illustrated a front component view of the reflector dish of FIG. 1A generally designated 500. The reflector dish is parabolic with a depressed center portion, a bulb guide 503 is formed in the center of the parabolic reflecting dish and beneath it is the laser window 504 through which the laser output may pass.

Referring now FIG. 2A there is illustrated a cut-away side view of an alternate embodiment of a handheld illumination device with a multi-function switching head, generally designated 20.

This embodiment uses the same tubular housing 11 and head assembly 300 described in FIG. 1A. Within the tubular housing 11 a roughly cylindrical secondary battery carriage 800, (which is similar to that secondary battery carriage detailed in applicant's related application Ser. No. 09/038, 726 entitled "Secondary Power Supply For Use With Handheld Illumination Devices"), is insertable into the tubular housing 11 through the tail end (not shown) before the primary battery supply 600 is inserted. Extending up and in plane with the front face 801 and the rear face 802 of the secondary battery carriage 800 are carriage catches 803, of a size and shape to fit movably within the carriage guide 21 formed axially along the top of the interior of the tubular housing 11. Formed at the front face 801 of the secondary battery carriage 800 is a multiple contact plate 804 whereby the secondary battery power supply 850 may be electrically and switchable connected via the dual output illumination head 225 to the light-bulb 700 and the laser emitting diode 750 which produces the laser output 751. The parabolic reflecting dish 500 moves forward and backward corresponding to the movement of the head assembly and focuses the light-bulb's output 701.

On the external surface of the secondary battery carriage 800 is a negative battery contact 805 which terminates on the face of the multiple contact plate 804 and is in contact with a conductive axial contact strip 22 which connects the rear terminal (not shown) of the primary battery power supply 600 with the second negative battery contact 805. A positive battery contact 806 which also terminates on the face of the multiple contact plate 804 extends to the conductive terminal link 807 mounted on the rear face 802 of the secondary battery carriage 800 and is in contact with the positive terminal 601 on the primary battery power supply.

Inside the secondary battery carriage 800, is a second negative battery contact 808 which extends from the rear terminal 851 of the secondary battery supply 850 and terminates on the face of the multiple contact plate 804. Inside the secondary battery carriage 800, is a second positive battery contact 809 which extends from the front terminal 852 of the secondary battery supply 850 and also terminates on the face of the multiple contact plate 804.

Referring now FIG. 2B there is illustrated a cut-away component view of the dual output illumination head shown in FIG. 2A, generally designated 225.

The dual output illumination head 225 has a circular front 226 surrounded by two arched dish guides 227 which prevent the parabolic reflecting dish 500 from rotating and restricts its movement to linear. The circular rear of the illumination head 228 is seated against the multiple contact plate 804. Through the circular front 226 a light-bulb catch 229 is formed into which a light-bulb 700 may be removably inserted. A first light-bulb contact 230 passes through the first light-bulb contact guide 231 extending from the rear of the light-bulb catch 229 and is in contact with the first contact strip 232. In this configuration the first contact strip 232 is conductively connected with the negative battery contact 805 for the primary battery supply 600. A second light-bulb contact 233 passes through the second light-bulb contact guide 234 and is in contact with the second contact strip 235. In this configuration the second contact strip 235 is in contact with the positive electrical contact 806 for the primary battery supply 600 and the light-bulb output 701 is generated by the light-bulb.

Also formed through the circular front 226 is a laser catch 236 which affixes a laser emitting diode with drive circuitry 750. The laser emitting diode is readily available and is known art. The diode comprises a laser beam module with a control circuit. Since the laser emitting diode is well known in the art, it is unnecessary to present a detailed statement of its construction in the present invention. A first laser contact 237 passes through the first laser contact guide 238 extending from the rear of the laser diode catch 236 and is in contact with the third contact strip 239. A second laser contact 240 passes through the second laser diode contact guide 241 and is in contact with the fourth contact strip 242. In this configuration the first laser contact 237, via the third contact strip 239, is conductively connected with the second negative battery contact 808, to complete the laser diode power circuit the fourth contact strip 242 is conductively connected with the second positive battery contact 809 and the laser output 751 is emitted by the laser emitting diode 750.

Referring now FIG. 2C there is illustrated a cut-away front view of the embodiment shown in FIG. 2A at line "A1". On the circular rear 228 the first light-bulb contact 232 and the first laser contact 239 protrude at a dissimilar distance from the center of the circular rear 228 and upon rotation of the dual output illumination head 225 the protruding contacts 232 & 239 will travel in distinct circular pathways. The second light-bulb contact 235 and the second laser contact 242 protrude in tear drop shape at the center of the circular rear of 228 and will both rotate around the center axis when the dual output illumination head 225 is rotated.

Referring now to FIG. 2D there is illustrated a cut-away front view of the side view of the embodiment in FIG. 2A at line "A2".

On the multiple contact plate 804 the negative battery contact 805 for the primary battery supply 600 terminates in an arc shape, which may be aligned, during rotation of the head assembly 300 (not shown) with the first light-bulb contact 232. The positive battery contact 806 for the primary battery supply 600 terminates in a half circle shape at the center of the multiple contact plate 804, whereby whenever the negative battery contact 805 is aligned with the first light-bulb contacts 232 the positive battery contact 806 will be aligned with the second light-bulb contact 235.

The second negative battery contact 808 which extends from the secondary battery carriage 800 also terminates in an arc shape and is closer to the center of the multiple contact plate 804 than the negative battery contact 805 and may be aligned, during rotation of the head assembly 300 (not shown) with the first laser contact 239. The second positive battery contact 809 from the secondary battery carriage 800 also terminates in a half circle shape at the center of the multiple contact plate 804 whereby whenever the second negative battery contact 808 is aligned with the first laser contact 239 the second positive battery contact 809 will be aligned with the second laser contact 242.

Referring now to FIG. 2E there is illustrated an overlay view of "A1" & "A2" of the embodiment shown in FIG. 2A. This overlay configuration shows the switching of electrical current to the laser and light-bulb in the "off" position.

In line, but remote, with the rotation pathway of the negative battery contact 805 for the primary battery supply 600 is the first light-bulb contact 232. In line, but remote, with the rotation pathway of the second negative battery contact 808 which extends from the secondary battery carriage 800 is the first laser contact 239. The positive battery contact 806 for the primary battery supply 600 and the second positive battery contact 809 from the secondary battery carriage 800 are adjacent to each other in the center of the multiple contact plate 804 and in contact with the second light-bulb contact 235 and the second laser contact 242.

Referring now to FIG. 2F there is illustrated a clockwise sequential rotational view of the overlay view "A1" & "A2" shown in FIG. 2E.

This overlay configuration shows the progressive switching of electrical current to the light-bulb along the line of arrow 1000, then to both the light-bulb and laser along the line of arrow 1001 and then to the laser only along the line of arrow 1002.

The clockwise rotation of the switching neck 301 causes the dual output illumination head 225 to rotate around it center axis thus moving the first and second light bulb contacts 232 & 235 and the first and second laser contact 239 & 242 simultaneously in a circular pathway, relative to the multiple contact head 804, whereby each circular pathway is defined by the distance of each contact 232, 235,239 & 242 from the center axis of the multiple contact head 804. During the rotation of the switching neck 301 the second light-bulb contact 235 and the second laser contact 239 which are "tear drop" shaped remain in a conductive contact with the first and second positive contacts 806 & 809 located at the center of the multiple contact head 804.

In the rotation sequence the first rotational increment along arrow 1000 seats the first light-bulb contact 232 on the negative battery contact 805, whereby the light-bulb is supplied electrical current.

The second rotational increment along arrow 1001 seats both the first light-bulb contacts 232 on the negative battery contact 805, and the first laser contact 239 on the second negative battery contact 808 whereby both the light-bulb and laser are supplied electrical current.

In the third rotational increment along arrow 1002 the first laser contact 239 is seated on the second negative battery contact 809, whereby the laser is supplied electrical current.

Referring now to FIG. 2G there is illustrated a counter-clockwise sequential rotational view of the overlay view "A1" & "A2" shown in FIG. 2E This overlay configuration shows the progressive switching of electrical current to the laser along the line of arrow 2000, then to both the light-bulb and laser along the line of arrow 2001 and then to the light-bulb only along the line of arrow 2002.

The counter-clockwise rotation of the switching neck 301 causes the dual output illumination head 225 to rotate around it center axis thus moving the first and second light bulb contacts 232 & 235 and the first and second laser contacts 239 & 242 simultaneously in a circular pathway, relative to the multiple contact head 804, whereby each circular pathway is defined by the distance of each contact 232, 235,239 & 242 from the center axis of the multiple contact head 804. During the rotation of the switching neck 301 the second light-bulb contact 235 and the second laser contact 239 which are "tear drop" shaped remain in a conductive contact with the first and second positive contacts 806 & 809 located at the center of the multiple contact head 804.

In this rotation sequence the first rotational increment along arrow 2000 the first laser contact 239 is seated on the second negative battery contact 809, whereby the laser is supplied electrical current.

The second rotational increment along arrow 2001 seats both the first light-bulb contacts 232 on the negative battery contact 805, and the first laser contact 239 on the second negative battery contact 808, whereby both the light-bulb and laser are supplied electrical current.

In the third rotational increment along arrow 2002 the first light-bulb contact 232 is seated on the negative battery contact 805, whereby the light-bulb is supplied electrical current.

Figure 3A:
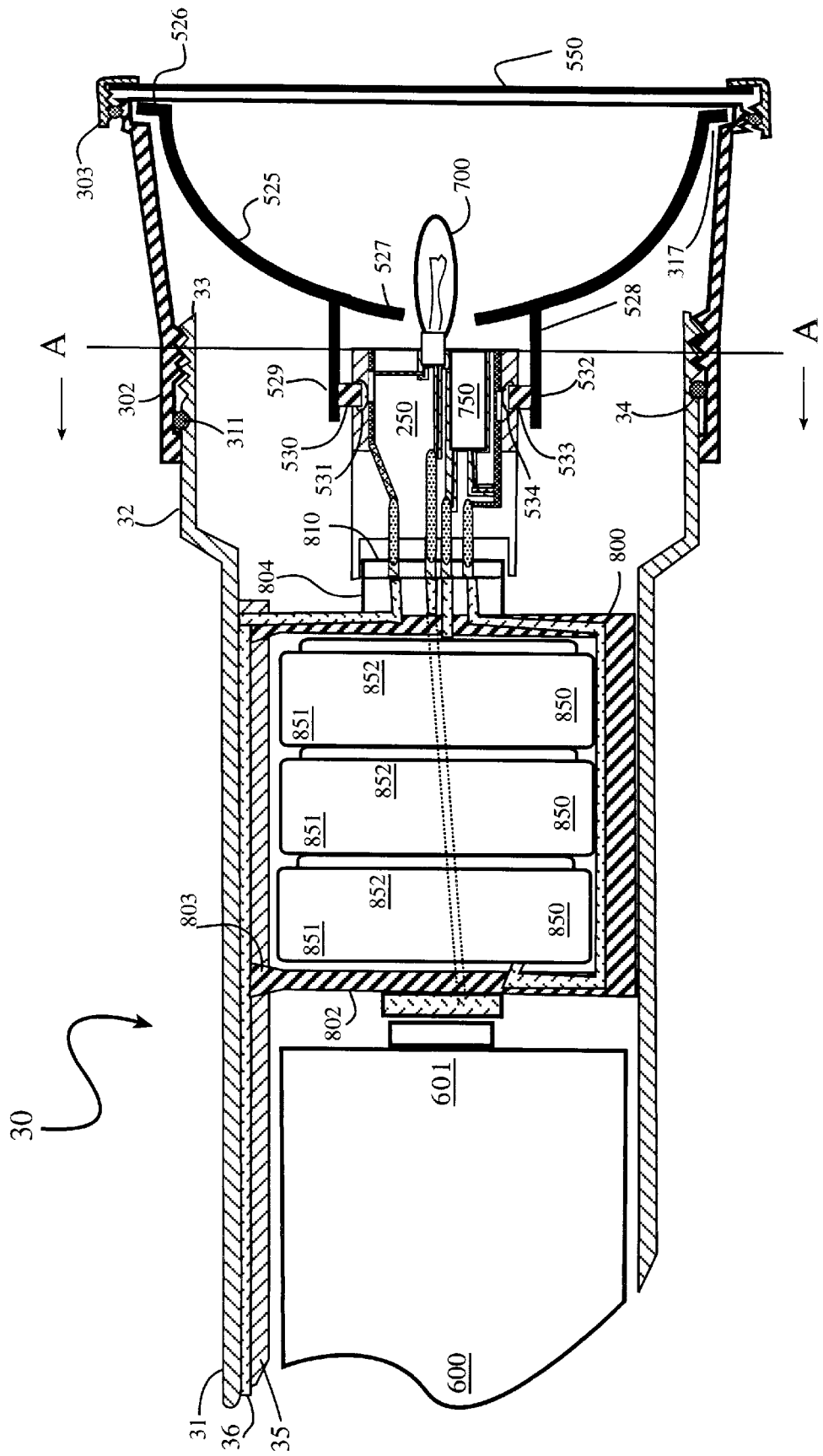
FIG. 3A illustrates a cut-away side view of an alternate embodiment of a handheld illumination device with a multi-function switching head.

Referring now to FIG. 3A there is illustrated a cut-away side view of a alternate embodiment of the handheld illumination device with a multi-function switching head, generally designated 30.

This embodiment uses the same focusing neck 302 and front collar 303 described in FIG. 1A. This embodiment is also constructed around a hollow cylindrical tubular body 31. Not shown is the open tail of the cylindrical tubular body 31 and the mating tail cap. At the front end of the cylindrical tubular body 31 a focusing neck mating support 32 is formed. The focusing neck mating support 32 is externally threaded 33 to mate with the internally threaded focusing neck 302. A "O" ring groove 34 to secure a medium sized "O" ring 311 circumscribes the focusing neck mating support 32, whereby a water-tight seal is formed between the focusing neck mating support 32 and the focusing neck 302.

Within the tubular housing 11 a roughly cylindrical secondary battery carriage 800, (which is similar to that secondary battery carriage detailed in applicant's related application Ser. No. 09/038,726 entitled "Secondary Power Supply For Use With Handheld Illumination Devices"), and as described in FIG. 2A is insertable into the tubular housing 31 through the tail end (not shown) before the primary battery supply 600 is inserted. Extending up and in-plane with the front face 801 and the rear face 802 of the secondary battery carriage 800 are carriage catches 803, of a size and shape to fit movably within the carriage guide 35 formed axially along the top of the interior of the tubular housing 31. Formed at the front face 801 of the secondary battery carriage 800 is a multiple contact plate 804 whereby the secondary battery power supply 850 may be electrically and switchable connected, via the plug-guide 810, to the plug-in illumination head 250 to the light-bulb 700 and the laser emitting diode 750 which produces the laser output 751. The parabolic reflecting dish 525 is movably held by the internal dish catch 317, via the extended leading edge 526, whereby the protective lens 550, which is mounted to the front collar 303 in a water-tight fashion, covers the extended leading edge 526 and prohibits the unrestricted movement of the parabolic reflecting dish 525.

A large illumination output guide 527 is formed in the center of the parabolic reflecting dish 525. Extending from the rear of the parabolic reflecting dish 525 is the plug-in illumination head guide 528 from which extend a first contact arm 529 supporting a first dish contact guide 530 which secures the first conductive dish contact 531 and a second contact arm 532 supporting a second dish contact 533 which secures the second conductive dish contact 534, whereby the laser 750, light-bulb 700, or combination may be selectively supplied electrical current through the plug-in illumination head's 250 switching circuitry shown in FIG. 3B.

Figure 3B:
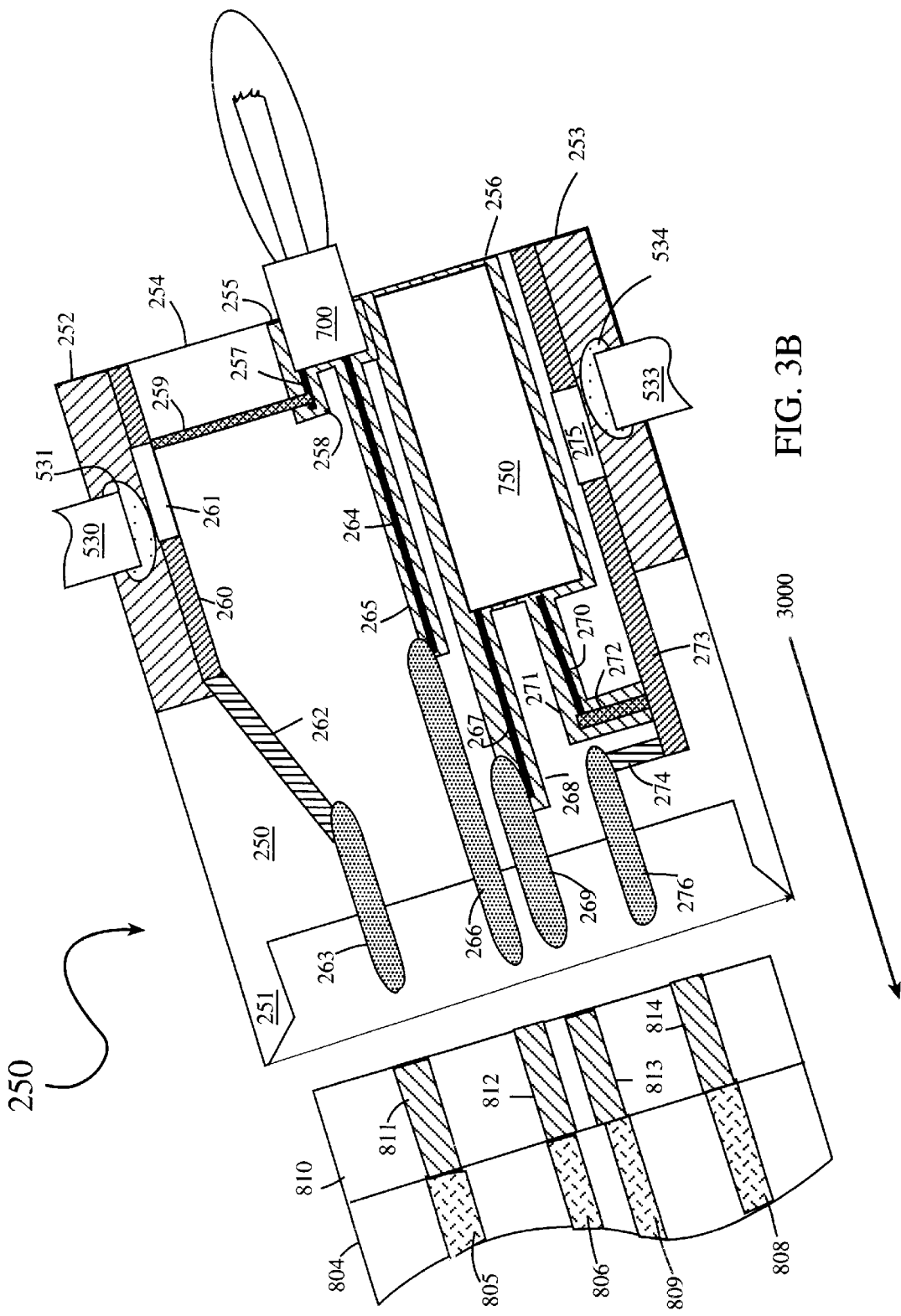
FIG. 3B illustrates a cut-away component view of the plug-in illumination head of the embodiment shown in FIG. 3A.

Referring now to FIG. 3B there is illustrated a cut-away component view of the plug-in illumination head of the embodiment shown in FIG. 3A, generally designated 250.

The plug-in illumination head 250 is electrically and switchable connected, via the plug-guide 810, to the multiple contact plate 804. Formed within the plug-guide 810 are four plug-in slots. The first slot 811 is connected to the negative terminal 805 of the primary battery power supply 600, the second slot 812 is connected to the positive terminal 806 of the primary battery power supply 600. The third slot 813 is connected to the second negative terminal 808 of the secondary battery power supply 850, and the fourth slot 814 is connected to the second positive terminal 809 of the secondary battery power supply 850.

The plug-in illumination head 250 is inserted into the plug-guide 810 along the line of arrow 3000. A inset mating guide 251 of a size and shape corresponding to the plug guide 810 and limiting insertion of the plug-in illumination head 250 in only one orientation is formed at the back of the illumination head 250 and fits snugly over the plug-guide 810.

The switch to provide electrical current to the laser emitting diode 750, the light-bulb 700, or both is a part of the parabolic reflecting dish 525. Mounted to or formed as part of the parabolic reflecting dish 525 are both the first dish contact guide 530 with first conductive dish contact 531 and the asecond dish contact 533 with the second conductive dish contact 534. A first dish contact positioning slot 252 and a second dish contact positioning slot 253 which each have an open front end and a closed back end are formed opposite each other on the sides of the plug-in illumination head 250. When the parabolic reflecting dish 525 is mounted on the plug-in illumination head 250 the first conductive dish contact 531 and the second conductive dish contact 534 are inserted into the open front end of the dish contact positioning slots 252 & 253. Through the circular front 254 a light-bulb catch 255 and a laser catch 256 are formed into which a light-bulb 700 and a laser emitting diode 750 may be removably inserted.

The light-bulb power circuit comprises a first light-bulb contact 257 which passes through the first light-bulb contact guide 258 extending from the rear of the light-bulb catch 255 and is in contact with the first contact strip 259 which then terminates at the conductive intermittent light-bulb power strip 260 affixed within the first dish contact positioning slot 252. A first small non-conductive plate 261 is affixed over a portion of the conductive intermittent light-bulb power strip 260, whereby electrical contact cannot be made. Parallel to, but not in contact with, the intermittent light-bulb power strip 260 is the light-bulb power strip 262, which is connected to the first plug 263 which mates with the first slot 811 and is connected to the negative terminal 805 of the primary battery power supply 600. The second light-bulb contact 264 passes through the second light-bulb contact guide 265 and is in contact with the second light-bulb power strip 266 which is connected to the second plug 264 which mates with the second slot 812 and is connected to the positive terminal 806 of the primary battery power supply 600.

In this configuration the first conductive dish contact 531 is seated on the first small non-conductive plate 261 and no electrical current is supplied to the light-bulb 700.

The laser power circuit comprises a first laser contact 267 which passes through the first laser contact guide 268 extending from the rear of laser catch 256 and is in contact with the third plug 269 which mates with the third slot 813 and is connected to the second positive terminal 809 of the secondary battery power supply 850. A second laser contact 270 which passes through the first laser contact guide 268 extending from the rear of laser catch 256 and is in contact with the third plug 269 which mates with the third slot 813 and is connected to the second positive terminal 809 of the secondary battery power supply 850. A second laser contact 270 which passes through the second laser contact guide 271 extending from the rear of the laser catch 256 and is in contact with the second contact strip 272 which then terminates at the conductive intermittent laser power strip 273 affixed within the second dish contact positioning slot 253. A second small non-conductive plate 275 is affixed over a portion of the conductive intermittent laser power strip 273, whereby electrical contact cannot be made. Parallel to, but not in contact with, the intermittent laser power strip 273 is the laser power strip 274, which is connected to the fourth plug 276 which mates with the fourth slot 814 and is connected to the negative terminal 808 of the secondary battery power supply 850.

In this configuration the second conductive dish contact 534 is seated on the second small non-conductive plate 275 and no electrical current is supplied to the laser emitting diode 750.

Figure 3C:
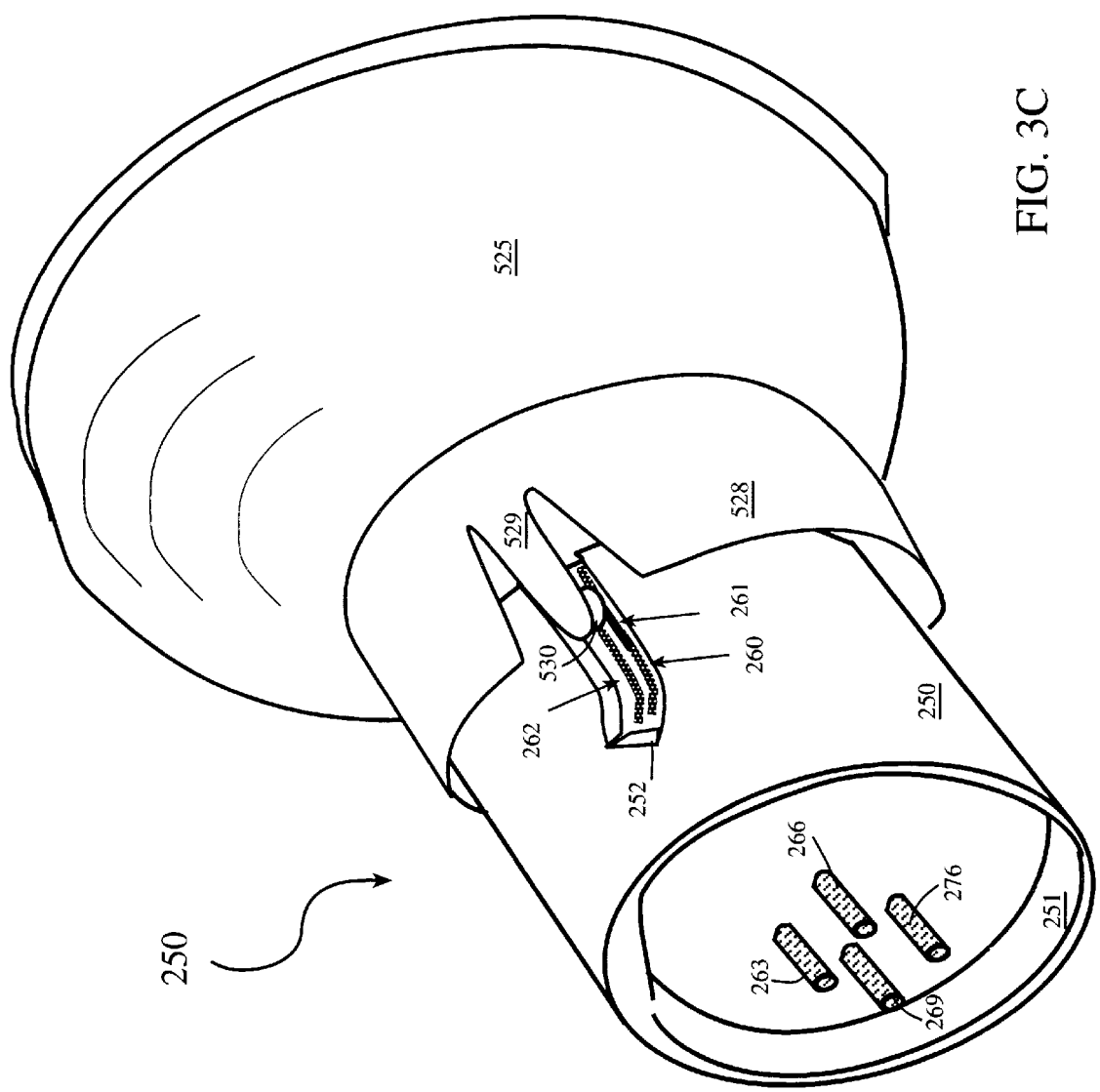
FIG. 3C illustrates a rear perspective component view of the illumination head and reflector dish with electrical contacts shown in FIG. 3A.

Referring now to FIG. 3C there is illustrated a rear perspective component view of the plug-in illumination head and reflector dish shown in FIG. 3A, generally designated 250.

Extending from the rear of the parabolic reflecting dish 525 is the plug-in illumination head guide 528 from which extend a first contact arm 529 supporting a first dish contact guide 530 which secures the first conductive dish contact 531, which is seated in the first dish contact positioning slot 252. The first conductive dish contact 531, this circuit is open in the "off" position with the first conductive dish contact 531 seated on the first small non-conductive plate 261, When the first conductive dish contact 531 is seated on both the intermittent light-bulb power strip 260 and the light-bulb power strip 262 the circuit is closed and in the "on" position.

Not shown on the opposite side of the plug-in illumination head 250 is the second contact arm 532 supporting a second dish contact 533 which secures the second conductive dish contact 534 which is seated in the second dish contact positioning slot 253, The rear 251 of the plug-in illumination head 250 forms a distinct non-circular shape to limit insertion of the four plugs 263,266,269 & 276 inset in the rear 251 of the plug-in illumination head 250 to the proper orientation into the plug-guide 810.

Referring now to FIG. 3D there is illustrated a side component view of left and right sides of the plug-in illumination head and reflector dish with electrical contacts shown in FIG. 3A.

On the left side of the plug-in illumination head 250 is the first dish contact positioning slot 252, extending from the illumination head guide 528 on the parabolic reflecting dish 525 is the first contact arm 529 supporting the first conductive dish contact 531 which is seated in the first dish contact positioning slot 252. In this configuration the first conductive dish contact 531 is shown forming an open circuit as it is seated on the first small non-conductive plate 261 and the light-bulb power strip 262. Simultaneously, on the right side of the plug-in illumination head 250 is the second dish contact positioning slot 253 also extending from the illumination head guide 528 is the second conductive dish contact 534 second which is seated in the first dish contact positioning slot 253. In this configuration the second conductive dish contact 534 is also forming an open circuit as it is seated on the second small non-conductive plate 275 and the laser power strip 274.

Not shown is the rotational movement, of the parabolic reflecting dish and the corresponding movement of the first and second conductive dish contact 531 & 534 in their respective contact positioning slot 252 & 253, whereby the light-bulb power circuit and/or the laser power circuit may be selectively closed.

Referring now to FIG. 3E there is illustrated a side view of the of left and right sides of the plug-in illumination head with cut-away reflector dish revealing the electrical contacts shown in FIG. 3D. The two open power circuits are formed by the first and second conductive dish contact 531 & 534 both seated, respectively, on the first and second non-conductive plates 261 & 275.

Referring now to FIG. 3F1 there is illustrated a left and right side clockwise sequential rotational view of the movement, along the line of arrow 1010, of the reflector dish mounted electrical contacts in relationship to the plug-in illumination head shown in FIG. 3E.

The first conductive dish contact 531 has moved down the first dish contact positioning slot 252 and is seated across the intermittent light-bulb power strip 260 and the light-bulb power strip 262, whereby the circuit to the light-bulb electrical circuit is closed. Simultaneously, the second conductive dish contact 534 has moved down second dish contact positioning slot 253 and remains seated is seated across the laser power strip 274 and the second small non-conductive plate 275, whereby the laser electrical circuit remains open.

Referring now to FIG. 3F2 there is illustrated a left and right side clockwise sequential rotational view of the movement, along the line of arrow 1020, of the reflector dish mounted electrical contacts in relationship to the plug-in illumination head shown in FIG. 3E.

The first conductive dish contact 531 has moved further down the first dish contact positioning slot 252 and remains seated across the intermittent light-bulb power strip 260 and the light-bulb power strip 262, whereby the light-bulb electrical circuit remains closed. Simultaneously, the second conductive dish contact 534 has continued to travel down second dish contact positioning slot 253 and is now seated across the laser power strip 274 and the intermittent laser power strip 273, whereby the laser electrical circuit is now closed.

Referring now to FIG. 3F1 there is illustrated a left and right side counter-clockwise sequential rotational view of the movement, along the line of arrow 2010, of the reflector dish mounted electrical contacts in relationship to the plug-in illumination head shown in FIG. 3E.

The first conductive dish contact 531 has moved up the first dish contact positioning slot 252 and is seated across the first non-conductive plates 261 and the light-bulb power strip 262, whereby the light-bulb electrical circuit remains open. Simultaneously, the second conductive dish contact 534 has moved up second dish contact positioning slot 253 and is seated across the laser power strip 274 and the intermittent laser power strip 273, whereby the laser electrical circuit is closed.

Referring now to FIG. 3G2 there is illustrated a left and right side counter-clockwise sequential rotational view of the movement, along the line of arrow 2020, of the reflector dish mounted electrical contacts in relationship to the plug-in illumination head shown in FIG. 3E.

The first conductive dish contact 531 has traveled further up first dish contact positioning slot 252 and is seated across the intermittent light-bulb power strip 260 and the light-bulb power strip 262, closing the electrical circuit to the light-bulb. Simultaneously, the second conductive dish contact 534 has continued to travel down second dish contact positioning slot 253 and is now seated across the laser power strip 274 and the intermittent laser power strip 273, whereby the laser power circuit remains closed.

Referring now to FIG. 4A there is illustrated a cut-away side view of a alternate embodiment of the handheld illumination device with a tail actuated multi-function switching head, generally designated 40.

The tubular housing 41 is open at both ends, mounted in the front end 42 is the slide illumination head 280. The front end 42 is externally threaded 43 to mate with the internally threaded back end 314 of the focusing neck 302. A roughly cylindrical secondary battery carriage 800, (which is similar to that secondary battery carriage detailed in applicant's related application Ser. No. 09/038,726 entitled "Secondary Power Supply For Use With Handheld Illumination Devices"), housing a secondary battery power supply 850 is insertable into the tubular housing 41 through the tail end 44 but is limited to one orientation by the secondary carriage positioning rail 45 which runs axially along the interior of tubular housing 41. A primary battery power supply 600 is inserted following the secondary battery carriage 800. The primary battery power supply 600 and the secondary battery carriage 800 are sealed within the tubular housing 41 via the tail cap 46, which is removably mounted to the tubular housing 41 through the tail end 44 the external threads 47 on the tail cap mate with the internal threads 48 at the tail end 44. A tail "O" ring 49 is affixed to the tail cap near the external threads 47, whereby a water-tight seal is formed.

Mounted within the slide illumination head 280 is the light-bulb 700 with electrical switching circuit and a laser emitting diode 750 with electrical switching circuit. The secondary battery carriage 800, has an elongated multi-contact head 820 which mates with the slide illumination head 280 and provides the electrical contacts for both the primary battery power supply 600 and secondary battery power supply 850. The rotation of the tail cap 46 in a clock-wise fashion causes the linear movement of the secondary battery carriage 800 within the tubular housing 41 and places the elongated multi-contact head 820 in conductive contact with the slide illumination head 280, whereby electrical current from the primary battery power supply 600 and/or secondary battery power supply 850, is supplied to the light-bulb 700 and/or the laser ewmitting diode 750.

To focus the output of the light-bulb 700 a parabolic reflecting dish 535 is mounted within the focusing neck 302 and secured via the front collar 303 and the protective lens 550, whereby movement of the focusing neck in relation to the tubular housing 41 will produce a spot or diffuse light-bulb output.

Referring now to FIG. 4B there is illustrated a top sectional view of the slide illumination head of the embodiment shown in FIG. 4A at line "4B", generally designated 280.

A water-tight seal is formed between the focusing neck 302 and the tubular housing 41 via a medium sized "O" ring 311 seated on the front end 42 of the tubular housing 41.

On the external surface of the secondary battery carriage 800 is the negative battery contact 805 which terminates on the face of the sliding contact plate 820 and extends to the conductive internal surface of the tubular housing 41 which connects the rear terminal (not shown) of the primary battery power supply 600. A positive battery contact 806 also terminates on the face of the sliding contact plate 820 and extends to the conductive terminal link 807 mounted on the rear face 802 of the secondary battery carriage 800 which is in contact with the positive terminal 601 on the primary battery power supply. On the surface of the sliding contact plate 820 is a first sliding contact 821 which is conductivity affixed to the positive battery contact 806 and a second sliding contact 822 which is conductivity affixed to the negative battery contact 805. A small non-conductive plate 823 is affixed over a portion of the first sliding contact 821.

The slide illumination head 280 has a circular front 281, and a circular rear 282 from which the slide guide 283 extends. Through the circular front 281 a light-bulb catch 284 is formed into which a light-bulb 700 may be removably inserted. A first light-bulb contact 285 passes through the first light-bulb contact guide 286 extending from the rear of the light-bulb catch 284 and is in contact with the first contact strip 287 affixed through the interior wall of the slide guide 283. A second light-bulb contact 288 passes through the second light-bulb contact guide 289 extending from the rear of the light-bulb catch 284 and is in contact with the second contact strip 290 also affixed through the interior wall of the slide guide 283. In this configuration the switching of electrical current "on" or "off" to the light-bulb 700 is accomplished via a series of aligned contacts.

The first contact strip 287 is aligned with the first sliding contact 821 and second contact strip 290 is aligned with the second sliding contact 822, A large non-conductive coil spring 824 is placed around both slide guide 283 and the sliding contact plate 820. When the tail cap (shown in FIG. 4A) is inserted into the tubular housing 41 the large non-conductive coil spring 824 compresses, the sliding contact plate 820 mates with the slide guide 283 and conductive contacts are formed between both the first contact strip 287 and first sliding contact 821, and the second contact strip 290 and second sliding contact 822, whereby electrical current is supplied to the light-bulb 700. At a for a pre-determined distance during insertion, the conductive contact between the first contact strip 287 and first sliding contact 821 is broken as the first contact strip 287 is seated on the small non-conductive plate 823.

Figure 4C:
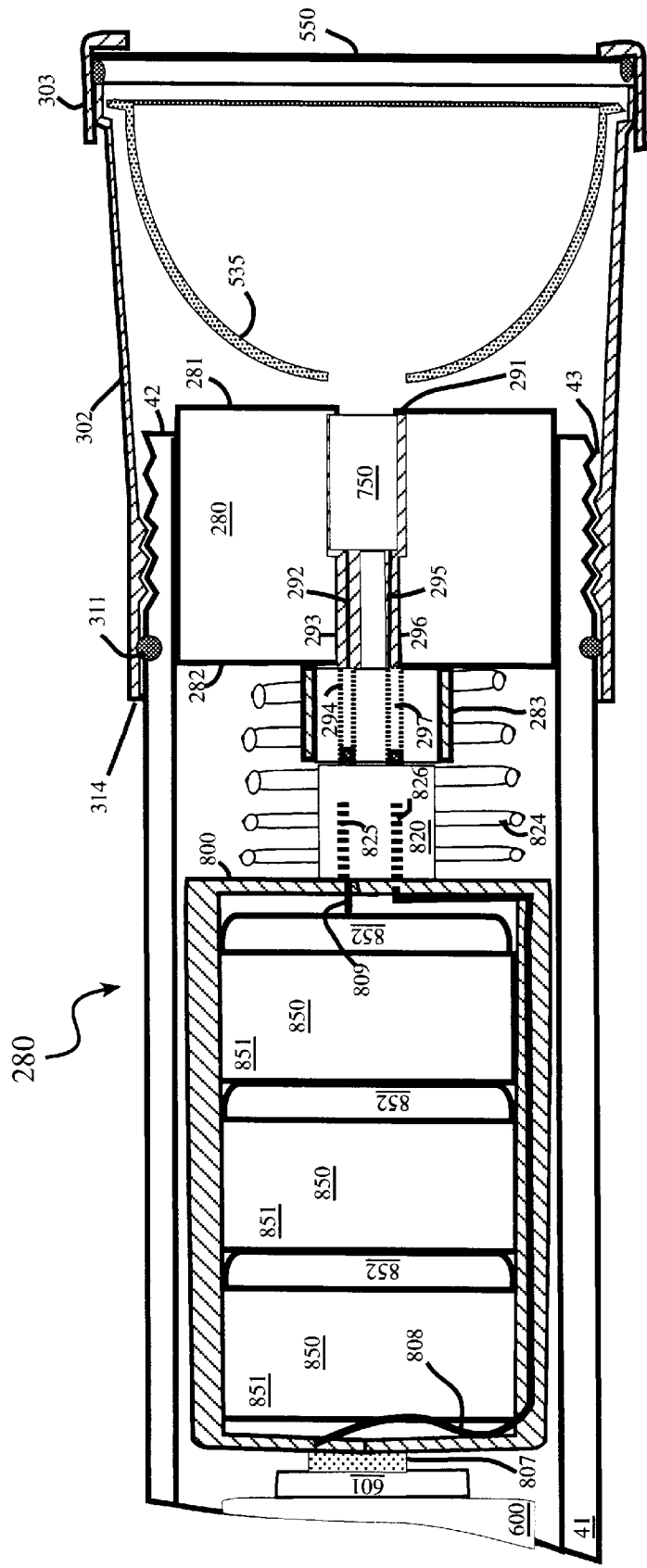
FIG. 4C illustrates a bottom sectional view of the slide illumination head of the embodiment shown in FIG. 4A at line "4C".

Referring now to FIG. 4C there is illustrated a bottom sectional view of the slide illumination head of the embodiment shown in FIG. 4A at line "4C", generally designated 280.

Inside the secondary battery carriage 800, is a second negative battery contact 808 which extends from the rear terminal 851 of the secondary battery power supply 850 and to the face of the sliding contact plate 820 at the third sliding contact 825. Also inside the secondary battery carriage 800, is a second positive battery contact 809 which extends from the front terminal 852 of the secondary battery power supply 850 to the face of the sliding contact plate 820 at the fourth sliding contact 826.

The slide illumination head 280 has a circular front 281, and a circular rear 282 from which the slide guide 283 extends. Through the circular front 281 a laser catch 291 is formed into which a laser emitting diode 750 may be inserted. A first laser contact 292 passes through the first laser contact guide 293 extending from the rear of the laser catch 291 and is in contact with the third contact strip 294 affixed through the interior wall of the slide guide 283. A second laser contact 295 passes through the second laser contact guide 296 extending from the rear of the laser catch 291 and is in contact with the fourth contact strip 297 also affixed through the interior wall of the slide guide 283. In this configuration the switching of electrical current "on" or "off" to the laser emitting diode 750 is accomplished via a series of aligned contacts. The third contact strip 294 is aligned with the third sliding contact 825 and fourth contact strip 297 is aligned with the fourth sliding contact 826, and the large non-conductive coil spring 824 is placed around both slide guide 283 and the sliding contact plate 820. When the tail cap (shown in FIG. 4A) is inserted into the tubular housing 41 the large non-conductive coil spring 824 compresses, the sliding contact plate 820 mates with the slide guide 283 and conductive contacts are formed between the third contact strip 294 and the third sliding contact 825, and between the fourth contact strip 297 and the fourth sliding contact 826 whereby electrical current is supplied to the laser emitting diode 750.

Referring now to FIG. 5A there is illustrated a front perspective assembly view of a alternate embodiment of the handheld illumination device with a finger actuated multi-function switching head, generally designated 50.

The tubular housing 51 is roughly ovoid and has a closed tail end 52 an enlarged front section 53, a switch guide 54 and the enlarged front section 53 has a circular opened front 55. Through the top of the oversized illumination head 325 is a switch alignment guide 326. The oversized illumination head 325 has a circular front 327 with a raised circular, dish positioning wall 328, formed concentrically around the center of the circular front 327 and a substantially planar circular rear wall 329. Removably mounted within the circular front 327 is a laser emitting diode 750 and a light bulb 700. After the illumination head 325 is inserted into the opened front 55 along the line of arrow 3001, a thumb actuated rotating switch 330 is inserted, along the line of arrow 3002, in through the switch guide 54 and the switch alignment guide 326. A parabolic reflecting dish 540 with a central light-bulb guide 541 and a concentric laser output window 542 is also inserted into the opened front 55 and is seated against the dish positioning wall 328 along the line of arrow 3003. The device is sealed via the large front collar 375 which supports the large protective lens 551, which is mounted along the line of arrow 3004.

Referring now to FIG. 5B there is illustrated a cut-away side view of the embodiment shown in FIG. 5A, generally designated 50.

The primary battery power supply 600 is comprised of two parallel rows of batteries forming a series connected via a large conductive link 56 affixed to the interior of the rear 52 of the tubular housing 51. The side by side and secondary battery power supply 850 is mounted in the ovoid shaped secondary battery carriage 835, (which is similar to that ovoid secondary battery carriage detailed in applicant's related application Ser. No. 09/038,726 entitled "Secondary Power Supply For Use With Handheld Illumination Devices"). To insert the primary battery power supply 600 and the secondary battery carriage 835, the enlarged front section 53 is removably mounted to the tubular housing 51 via an internally threaded backside 58 which mates with the externally threaded connection neck 59 of the tubular housing 51 and a thick "O" ring 60 is interposed bewteen the internally threaded backside 58 and the externally threaded connection neck 59 to form a water-tight seal.

On the front of the ovoid shaped secondary battery carriage 835 is a multi-contact head 836 which aligns with a series of conductive contacts on the oval rear wall 329 of the illumination head 325, which in-turn align with a series of switching contacts on the rotating switch 330 whereby electrical current is switched to the light-bulb 700 and/or laser emitting diode 750. Through the circular front 327 of the oversized illumination head 325 a light-bulb catch is formed 337 which removably secures a light-bulb 700 and a laser catch is also formed 338 into which a laser emitting diode 750 may be inserted. Through the circular rear wall 329 a mating socket is formed to accept the multi-contact head 836.

The rotating switch 330 is affixed to the tubular housing 51 via a snap-in catch 331. The snap-in catch 331 has an enlarged footing 332 which is retained against the circular catch 333 formed in the bottom of the oversized illumination head 325. The finger lever 334 formed at the top of the rotating switch 330 allows for one finger actuation. A wide "O" ring 335 seated between the finger lever 334 switch guide 54 forms a water-tight seal, and ridges are formed on the sides of the thumb lever 336 to provide a superior gripping surface for actuation of the finger lever 334.

The large front collar 375 which supports the large protective lens 551, is removably affixed to the opened front 55 via the internally threaded 376 large front collar 375 which mates with the externally threaded 61 opened front 55. A rubber or silicone seal 377 is affixed between the large protective lens 551 and the large front collar 375 to assure a water-tight seal. To vent expanding gases a one-way valve 62 is mounted through the wall of the tubular housing 51. To control the accumulated hydrogen gas from battery operation a hydrogen scavenging catalyst 63 may also be placed within the device.

Referring now to FIG. 5C1 there is illustrated a cut-away component view of the counter-clockwise switch rotation of the finger actuated switch shown in FIG. 5B, generally designated 325.

In this configuration the thumb switch 330 is rotated along the line of arrow 1030 and the switching of electrical current to the laser emitting diode 750 is accomplished via a series of aligned rotating electrical contacts which partially surround the thumb switch 330 and which conductively bridge the multi-contact head 836 (which is connected to the primary battery power supply 600 and the secondary battery power supply 850) to the oversized illumination head 325

The light-bulb 700 switch has a first light-bulb contact 340 which passes through the first light-bulb contact guide 341 extending from the rear of the light-bulb catch 337, terminating in a first enlarged end 342 which is seated against the first circular contact strip 343 which, if rotated, would align with the first contact 837 on the multi-contact head 836. Not shown is the conductive link between the first contact 837 and the negative terminal of the primary battery power supply 600. The light-bulb 700 switch also has a second light-bulb contact 344 which passes through the second light-bulb contact guide 345 and terminates in a second enlarged end 346 which is seated against the second circular contact strip 347 which is aligned with the second contact 838 on the multi-contact head 836. Not shown is the conductive link between the second contact 838 to the positive terminal of the primary battery power supply 600. In this configuration the light-bulb 700 is not receiving electrical current.

The laser emitting diode 750 switch has a first laser contact 348 which passes through the first laser contact guide 349 extending from the rear of the laser catch 338, terminating in a third enlarged end 350 which is seated against the third circular contact strip 351 aligned with the third contact 839 on the multi-contact head 836. Not shown is the conductive link between the third contact 839 and the negative terminal of the secondary battery power supply 850. The laser emitting diode 750 switch also has a second laser contact 352 which passes through the second laser contact guide 353 and terminates in a fourth enlarged end 354 which is seated against the fourth circular contact strip 355 which is aligned with the fourth contact 840 on the multi-contact head 836. Not shown is the conductive link between the fourth contact 840 to the positive terminal of the secondary battery power supply 850. In this configuration the laser emitting diode 750 is receiving electrical current and a laser output 751 is occurring.

Referring now to FIG. 5C2 there is illustrated a cut-away component view of the counter-clockwise switch rotation of the finger actuated switch shown in FIG. 5B, generally designated 325.

In this configuration the thumb switch 330 is rotated along the line of arrow 1030 and then arrow 1040 thereby switching electrical current to the light-bulb 700 and then laser emitting diode 750.

The first light-bulb contact 340 terminating at the first enlarged end 342 is seated against the first circular contact strip 343 which is connected to the first contact 837 on the multi-contact head 836. The second light-bulb contact 344 which terminates at the second enlarged end 346 is seated against the second circular contact strip 347 which is connected to the second contact 838 on the multi-contact head 836, thereby providing electrical current to the light-bulb 700 and generating a light-bulb output 701.

The first laser contact 348 terminating at the third enlarged end 350 is seated against the third circular contact strip 351 which is connected with the third contact 839 on the multi-contact head 836. The second laser contact 352 which terminates at the fourth enlarged end 354 is seated against the fourth circular contact strip 355 which is connected to the fourth contact 840 on the multi-contact head 836. In this configuration the laser emitting diode 750 is receiving electrical current and a laser output 751 is occurring.

Referring now to FIG. 5D1 there is illustrated a cut-away component view of the clockwise switch rotation of the finger actuated switch shown in FIG. 5B, generally designated 325.

In this configuration the thumb switch 330 is rotated along the line of arrow 2030 and the switching of electrical current to the laser emitting diode 750 is accomplished via a series of aligned rotating electrical contacts which partially surround the thumb switch 330 and which conductively bridge the multi-contact head 836 (which is connected to the primary battery power supply 600 and the secondary battery power supply 850) to the oversized illumination head 325

The light-bulb 700 switch has a first light-bulb contact 340 which passes through the first light-bulb contact guide 341 extending from the rear of the light-bulb catch 337, terminating in a first enlarged end 342 which is seated against the first circular contact strip 343 aligned with the first contact 837 on the multi-contact head 836. Not shown is the conductive link between the first contact 837 and the negative terminal of the primary battery power supply 600. The light-bulb 700 switch also has a second light-bulb contact 344 which passes through the second light-bulb contact guide 345 and terminates in a second enlarged end 346 which is seated against the second circular contact strip 347 which is aligned with the second contact 838 on the multi-contact head 836. Not shown is the conductive link between the second contact 838 to the positive terminal of the primary battery power supply 600. In this configuration the light-bulb 700 is receiving electrical current and a light-bulb output 701 is occurring.

The laser emitting diode 750 switch has a first laser contact 348 which passes through the first laser contact guide 349 extending from the rear of the laser catch 338, terminating in a third enlarged end 350 which is seated against the third circular contact strip 351 aligned with the third contact 839 on the multi-contact head 836. Not shown is the conductive link between the third contact 839 and the negative terminal of the secondary battery power supply 850. The laser emitting diode 750 switch also has a second laser contact 352 which passes through the second laser contact guide 353 and terminates in a foutth enlarged end 354 which is seated against the fourth circular contact strip 355 which, when rotated aligns with the fourth contact 840 on the multi-contact head 836. Not shown is the conductive link between the fourth contact 840 to the positive terminal of the secondary battery power supply 850. In this configuration the laser emitting diode 750 is not receiving electrical current.

Referring now to FIG. 5D2 there is illustrated a cut-away component view of the clockwise switch rotation of the finger actuated switch shown in FIG. 5B, generally designated 325.

In this configuration the thumb switch 330 is rotated along the line of arrow 2030 and then arrow 2040 for the switching of electrical current to the light-bulb 700 and the laser emitting diode 750.

The first light-bulb contact 340 terminating in a first enlarged end 342 is seated against the first circular contact strip 343 which is connected to the first contact 837 on the multi-contact head 836. The second light-bulb contact 344 which terminates in a second enlarged end 346 is seated against the second circular contact strip 347 which is connected to the second contact 838 on the multi-contact head 836. In this configuration the light-bulb 700 is receiving electrical current and a light-bulb output 701 is occurring.

The first laser contact 348 terminates in a third enlarged end 350 which is seated against the third circular contact strip 351 connected to the third contact 839, on the multi-contact head 836. The second laser contact 352 which terminates in a fourth enlarged end 354 is seated against the fourth circular contact strip 355 which is connected to the fourth contact 840 on the multi-contact head 836. In this configuration the laser emitting diode 750 is receiving electrical current and a laser output 751 is occurring.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A handheld illuminator with a multi-function switching head, comprising:

(a) a battery power supply with a positive and a negative terminal;

(b) a flashlight-type cylindrical casing;

(c) a rotatable head assembly of a size and shape to mate with the front of said flashlight-type casing, comprising;

(1) a rotatable switching neck;

(2) a first illumination means with a positive and negative lead wire;

(3) a second illumination means with a positive and negative lead wire;

(4) a non-conductive contact head mounted within said rotatable switching neck, with a plurality of guides traversing from a front side of said contact head to a backside of said contact head, wherein said first illumination means and said second illumination means are removably affixed in to said front side of said contact head and said lead wires of said first and second illumination sources pass through and conductively connect with corresponding conductive strips which terminate in pre-determined orientations on said backside;

(d) a non-conductive switching plate affixed within said flashlight-type casing adjacent to and aligned with said contact head, upon which terminate the positive and negative terminals of said battery power supply, wherein preselected rotational movement of said rotatable switching neck switchably connects said conductive strips, thereby connecting said first illumination means lead wires, said second illumination means, or both said first and second illumination means lead wires with said positive and negative terminals of said battery power supply;

(e) a focusing neck rotatably mated around said switching neck; and, (f) a clear lens affixed with a collar to the front of said focusing neck.

2. The handheld illuminator with a multi-function switching head, according to claim 1, further comprising a gripping surface of ribs formed around the circumference of said switching neck.

3. The handheld illuminator with a multi-function switching head, according to claim 1, further comprising a switch latch which extends from said switching neck and momentarily latches with depressed catches formed around the circumference of the front of said flashlight-type casing, whereby the rotation of the switching neck are guided to pre-determined stops which correspond to the alignment of lead wires for said first illumination means, said second illumination means, or both said first and second illumination means, with said positive and negative terminals of said battery power supply.

4. The handheld illuminator with a multi-function switching head, according to claim 1, further comprising:

(a) a sealant means disposed between said flashlight-type casing and said switching neck, between said focusing neck and said switching neck and between said focusing neck and said collar with clear lens affixed whereby water-tight seals are formed; and, (b) a gas scavenging means, whereby hydrogen gases produces during operation of the device are scavenged.

5. The handheld illuminator with a multi-function switching head, according to claim 1, wherein said sealant means are silicone rubber or rubber "O" rings.

6. The handheld illuminator with a multi-function switching head, according to claim 1, wherein said first and said second illumination means are both laser emitting sources.

7. The handheld illuminator with a multi-function switching head, according to claim 6, wherein said laser emitting sources are selected from the group consisting of diode-pumped, CW diode, Q-switched diode, solid-state, solid-state CW, solid-state Q-switched, gas, gas and metal, ion, dye, and rare-earth element lasers.

8. The handheld illuminator with a multi-function switching head, according to claim 1, wherein said first illumination means is a light-bulb, and said second illumination means is a laser emitting source.

9. The handheld illuminator with a multi-function switching head, according to claim 8, further comprising a parabolic reflecting dish of a size and shape to fit around said light-bulb affixed within said focusing neck, and behind said clear lens, wherein the movement of said focusing neck relative to said switching neck, adjusts the focal point of said light-bulb with respect to said parabolic reflecting dish.

10. The handheld illuminator with a multi-function switching head, according to claim 9, wherein said light-bulb is selected from the group consisting of single filament light bulbs, dual filament light bulbs, halide light bulbs, tungsten light bulbs, xenon light bulbs, krypton light bulbs, halogen-krypton light bulbs, halogen-xenon light bulbs, light emitting diodes, and laser emitting illumination means is selected from the group consisting of diode-pumped, CW diode, Q-switched diode, solid-state, solid-state CW, solid-state Q-switched, and rare-earth element lasers.

11. The handheld illuminator with a multi-function switching head, according to claim 1, further comprising a secondary power supply with a secondary positive terminal and a secondary negative terminal which terminate upon said non-conductive switching plate wherein preselected rotational movement of said rotatable switching neck switchably connects said conductive strip connected to said first illumination means lead wires with said positive and negative terminals of said battery power supply and said conductive strip connected to said second illumination means lead wires with said secondary positive and negative terminals of said secondary battery power supply.

12. The handheld illuminator with a multi-function switching head, according to claim 11, wherein said first illumination means is a light-bulb, and said second illumination means is a laser emitting source.

13. The handheld illuminator with a multi-function switching head, according to claim 12, further comprising a parabolic reflecting dish of a size and shape to fit around said light-bulb affixed within said focusing neck, and behind said clear lens, whereby the movement of said focusing neck relative to said switching neck, adjusts the focal point of said light-bulb with respect to said parabolic reflecting dish.

* * * * *